United States Patent
Li et al.

(10) Patent No.: US 11,343,782 B2
(45) Date of Patent: May 24, 2022

(54) METHOD OF TRANSMITTING SYNCHRONIZED SIGNAL BLOCK, NETWORK EQUIPMENT, AND USER EQUIPMENT

(71) Applicant: VIVO MOBILE COMMUNICATION CO., LTD., Chang'an Dongguan (CN)

(72) Inventors: Na Li, Chang'an Dongguan (CN); Kai Wu, Chang'an Dongguan (CN); Xiaodong Shen, Chang'an Dongguan (CN); Yu Ding, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 32 days.

(21) Appl. No.: 16/608,961

(22) PCT Filed: Apr. 27, 2018

(86) PCT No.: PCT/CN2018/084813
§ 371 (c)(1),
(2) Date: Oct. 28, 2019

(87) PCT Pub. No.: WO2018/196848
PCT Pub. Date: Nov. 1, 2018

(65) Prior Publication Data
US 2020/0196260 A1  Jun. 18, 2020

(30) Foreign Application Priority Data
Apr. 28, 2017 (CN) .......................... 201710296851.9

(51) Int. Cl.
*H04J 3/06* (2006.01)
*H04W 56/00* (2009.01)
*H04W 72/04* (2009.01)

(52) U.S. Cl.
CPC ..... *H04W 56/0005* (2013.01); *H04W 72/0453* (2013.01)

(58) Field of Classification Search
CPC ........... H04W 56/001; H04W 56/0015; H04W 56/00; H04W 76/14; H04L 5/0048
See application file for complete search history.

(56) References Cited

U.S. PATENT DOCUMENTS

2015/0023263 A1   1/2015 Son et al.
2017/0318559 A1* 11/2017 Islam ................... H04W 72/005
(Continued)

FOREIGN PATENT DOCUMENTS

CN   103096329 A    5/2013
CN   104104636 A   10/2014
(Continued)

OTHER PUBLICATIONS

3GPP TSG RAN WG1 NR Ad-Hoc Meeting R1-1700456, Spokane, USA, Jan. 16-20, 2017 (Year: 2017).*
(Continued)

*Primary Examiner* — Atique Ahmed
(74) *Attorney, Agent, or Firm* — von Briesen & Roper, s.c.

(57) ABSTRACT

A method of transmitting a synchronized signal block (SS block), network equipment, and user equipment are disclosed. The SS block includes a New Radio (NR)-primary synchronized signal (PSS), an NR-secondary synchronized signal (SSS), and an NR-physical broadcast channel (PBCH) signal. The method includes: network equipment transmits the NR-PSS by using a first frequency domain resource, transmits the NR-SSS by using a second frequency domain resource, and transmits the NR-PBCH signal by using a third frequency domain resource; and user equipment receives the NR-PSS by using the first frequency
(Continued)

domain resource, receives the NR-SSS by using the second frequency domain resource, and receives the NR-PBCH signal by using the third frequency domain resource. A position relationship among the first frequency domain resource, the second frequency domain resource, and the third frequency domain resource satisfies a preset condition.

8 Claims, 33 Drawing Sheets

(56) References Cited

U.S. PATENT DOCUMENTS

| | | | |
|---|---|---|---|
| 2017/0359791 A1* | 12/2017 | Onggosanusi | H04L 5/0023 |
| 2018/0084593 A1* | 3/2018 | Chen | H04L 5/0048 |
| 2018/0159713 A1 | 6/2018 | Li et al. | |
| 2018/0198659 A1* | 7/2018 | Ko | H04L 5/005 |
| 2018/0248642 A1* | 8/2018 | Si | H04L 5/0092 |
| 2019/0029005 A1* | 1/2019 | Bendlin | H04W 72/042 |
| 2019/0190747 A1* | 6/2019 | Park | H04W 52/325 |
| 2019/0357239 A1* | 11/2019 | Moon | H04L 5/0007 |

FOREIGN PATENT DOCUMENTS

| | | | | |
|---|---|---|---|---|
| CN | 106507439 A | 3/2017 | | |
| EP | 3513537 A1 | 7/2019 | | |
| WO | WO 2017/039373 A1 | 3/2017 | | |
| WO | WO 2018/052275 A1 | 3/2018 | | |
| WO | WO-2018052275 A1 * | 3/2018 | | H04L 27/26025 |

OTHER PUBLICATIONS

3GPP TSG RAN WG1 Meeting #88bis R1-1704537 Spokane, USA, Apr. 3-7, 2017 (Year: 2017).*

International Search Report related to Application No. PCT/CN2018/084813 dated Jun. 25, 2018.

First CN Office Action related to Application No. 201710296851.9 dated Jan. 7, 2020.

CATT; Multiplexing of Broadcast Channel and Synchronization Channels, 3GPP TSG RAN WG1 Meeting #87, R1-1611372, Reno, NV, USA Nov. 14, 2016-Nov. 18, 2016.

ZTE, ZTE Microelectronics; NR-SS: Bandwidth, Multiplexing 3GPP TSG RAN WG1 AH_NR Meeting R1-1700097, Spokane, USA Jan. 16, 2017-Jan. 20, 2017.

Second CN Office Action related to Application No. 201710296851.9 dated Apr. 10, 2020.

Qualcomm Incorporated; Synchronization signal sequence design consideration; 3GPP TSG-RAN WG1 NR AdHoc R1-1700787, Spoken, USA Jan. 16, 2017-Jan. 20, 2017.

CATT; Transmission scheme and DMRS of NR PBCH; 3GPP TSG RAN WG1 Meeting #88bis RI-1704537, Spokane USA. Apr. 3, 2017-Apr. 7, 2017.

Extended European Search Report related to Application No. 18790501.3 dated Feb. 27, 2020.

Qualcomm Incorporated: "Synchronization page bandwidth and sequence design", 3GPP Draft; R1-1706147, vol. RAN WG1, No. Spokane, USA Apr. 3, 2017-Apr. 7, 2017.

LG Electronics; "Discussion on SS bandwidth and multiplexing"; 3GPP TSG RAN WG1 NR Ad-Hoc Meeting RI-1700456, Spokane, USA Jan. 16, 2017-Jan. 20, 2017.

LG Electronics; "NR PBCH Design"; 3GPP TSG WG1 Meeting #87, R1-1611787, Reno, USA Nov. 14, 2016-Nov. 18, 2016.

Samsung; "Multiplexing of synchronization signals and system information delivery channels for below 6 GHz and above 6 GHz"; 3GPP TSG RAN WG1 Meeting #86bis, R1-1609111, Lisbon, Portugal, Oct. 10, 2016-Oct. 14, 2016.

European Office Action for related Application No. 18790501.3; dated Oct. 29, 2021.

Samsung, "Initial access signal mapping and multiplexing for sub6GHz", Nov. 14-18, 2016, 3GPP TSG RAN WG1 Meeting #87, Reno, USA.

* cited by examiner

METHOD OF TRANSMITTING SYNCHRONIZED SIGNAL BLOCK, NETWORK EQUIPMENT, AND USER EQUIPMENT

CROSS-REFERENCE TO RELATED APPLICATION

This patent application is a 35 USC § 371 U.S. national stage of International Application No. PCT/CN 2018/084813 filed on Apr. 27, 2018, which claims a priority to Chinese Patent Application No. 201710296851.9 filed on Apr. 28, 2017, a disclosure of which is incorporated in its entirety by reference herein.

TECHNICAL FIELD

The present disclosure relates to the field of communication technology, in particular to a method of transmitting a synchronized signal block (SS block), network equipment, and user equipment.

BACKGROUND

Before communicating with a core network, a terminal needs to carry out a cell search to find a cell in which the terminal is located, and synchronize with the cell, so as to receive and decode information required to communicate with the cell and operate normally. Specifically, the terminal obtains downlink synchronization and physical layer cell identity (cell ID) information of the cell by detecting a primary synchronized signal (PSS) and a secondary synchronized signal (SSS) at a particular position, and then acquires required cell system information by receiving a physical broadcast channel (PBCH) signal.

In a Long Term Evolution (LTE) system, two special signals, namely, a PSS and an SSS, are transmitted on each downlink component carrier for assisting cell search. The PSS is obtained by extending a length-63 Zadoff-Chu sequence at both ends with five zeros and finally mapping the extended sequence to six central physical resource blocks (PRB). Similar to the PSS, the SSS also occupies six central PRBs. A PBCH is used to transmit limited required cell system information. Since the terminal may be not aware of downlink cell bandwidth when receiving the PBCH, the transmission of PBCH is confined to 72 central subcarriers regardless of the cell bandwidth. That is, the PSS/SSS occupies the same number of resource blocks in frequency domain as the PBCH and is mapped to the same frequency domain positions as the PBCH. In the time domain direction, in the frequency division duplex (FDD) mode, the PSS is transmitted in the last symbol of the first slot of each of subframe 0 and subframe 5. The SSS is transmitted in a symbol immediately adjacent to the last symbol in the same slot. That is, the SSS is located in the symbol preceding the PSS. In the time division duplex (TDD) mode, the PSS is transmitted in the third symbol of each of subframe 1 and subframe 6, that is, in a downlink pilot time slot (DwPTS) field; while the SSS is transmitted in the last symbol of each of subframe 0 and subframe 5, that is, the SSS is transmitted in a symbol three symbols in advance of the PSS. In both the FDD and TDD, the PBCH is transmitted in the first four symbols of the second slot of subframe 0. Therefore, in the FDD, the PBCH is immediately after the PSS and SSS in subframe 0.

In a design of a New Radio (NR) system, an NR-PSS and an NR-SSS are used to assist cell search, and an NR-PBCH is used to transmit required system information. Both the NR-PSS and the NR-SSS have a sequence length of 127 and need to occupy a frequency domain resource of 12 NR-PRBs. The NR-PBCH occupies a bandwidth of 288 subcarriers, that is, 288/12=24 PRBs. Therefore, the number of resource blocks occupied by the NR-PSS/NR-SSS in frequency domain is different from that by the NR-PBCH, and a frequency domain resource mapping relationship of the LTE system is not applicable to the NR system.

SUMMARY

Embodiments of the present disclosure provide a method of transmitting an SS block, network equipment, and user equipment, to solve the problem that a frequency domain resource mapping relationship of an LTE system is not applicable to an NR system.

In a first aspect, an embodiment of the present disclosure provides a method of transmitting an SS block, applied to a network equipment side, where an SS block includes an NR-PSS, an NR-SSS, and an NR-PBCH signal, and the method includes the following steps: transmitting the NR-PSS by using a first frequency domain resource, transmitting the NR-SSS by using a second frequency domain resource, transmitting the NR-PBCH signal by using a third frequency domain resource, where a position relationship among the first frequency domain resource, the second frequency domain resource, and the third frequency domain resource satisfies a preset condition.

In a second aspect, an embodiment of the present disclosure further provides a method of transmitting an SS block, applied to a user equipment side, where an SS block includes an NR-PSS, an NR-SSS, and an NR-PBCH signal, and the method includes the following steps: receiving the NR-PSS by using a first frequency domain resource, receiving the NR-SSS by using a second frequency domain resource, receiving the NR-PBCH signal by using a third frequency domain resource, where a position relationship among the first frequency domain resource, the second frequency domain resource, and the third frequency domain resource satisfies a preset condition.

In a third aspect, an embodiment of the present disclosure provides network equipment, including: a transmission module, configured to: transmit an NR-PSS in an SS block by using a first frequency domain resource, transmit an NR-SSS in the SS block by using a second frequency domain resource, transmit an NR-PBCH signal in the SS block by using a third frequency domain resource, where a position relationship among the first frequency domain resource, the second frequency domain resource, and the third frequency domain resource satisfies a preset condition.

In a fourth aspect, an embodiment of the present disclosure provides user equipment, including: a reception module, configured to: receive an NR-PSS in an SS block by using a first frequency domain resource, receive an NR-SSS in the SS block by using a second frequency domain resource, receive an NR-PBCH signal in the SS block by using a third frequency domain resource, where a position relationship among the first frequency domain resource, the second frequency domain resource, and the third frequency domain resource satisfies a preset condition.

In a fifth aspect, an embodiment of the present disclosure provides network equipment, including: a storage, a processor, and a computer program stored in the storage and configured to be executed by the processor, where the processor is configured to execute the computer program, to implement the steps of the method of transmitting an SS block as described in the foregoing first aspect.

In a sixth aspect, an embodiment of the present disclosure provides user equipment, including: a storage, a processor, and a computer program stored in the storage and configured to be executed by the processor, where the processor is configured to execute the computer program, to implement the steps of the method of transmitting an SS block as described in the foregoing second aspect.

In a seventh aspect, an embodiment of the present disclosure provides a computer readable storage medium, storing therein a computer program, where the program is configured to be executed by a processor, to implement the steps of the method of transmitting an SS block as described in the foregoing first aspect and/or the steps of the method of transmitting an SS block as described in the foregoing second aspect.

As such, in the embodiments of the present disclosure, a position relationship among a first frequency domain resource, a second frequency domain resource, and a third frequency domain resource satisfies a preset condition, an NR-PSS is transmitted by using the first frequency domain resource, an NR-SSS is transmitted by using the second frequency domain resource, an NR-PBCH signal is transmitted by using the third frequency domain resource. The transmission of an SS block is enabled in an NR system by using the foregoing frequency domain resource mapping relationship.

BRIEF DESCRIPTION OF THE DRAWINGS

To describe the technical solutions in the embodiments of the present disclosure more clearly, the accompanying drawings required for describing the embodiments of the present disclosure are briefly described hereinafter. Apparently, the drawings accompanying the following descriptions show only some embodiments of the present disclosure, and a person of ordinary skill in the art may still derive other drawings from these accompanying drawings without creative efforts.

DETAILED DESCRIPTION

The exemplary embodiments of the present disclosure are further described below in detail with reference to the accompanying drawings. The exemplary embodiments of the present disclosure are shown in the accompanying drawings. However, it should be understood that the present disclosure may be implemented in various forms and should not be construed as being limited to the embodiments set forth herein. Rather, these embodiments are provided so that the present disclosure will be understood more thoroughly, and can fully convey the scope of the present disclosure to a person skilled in the art.

Figure 1:
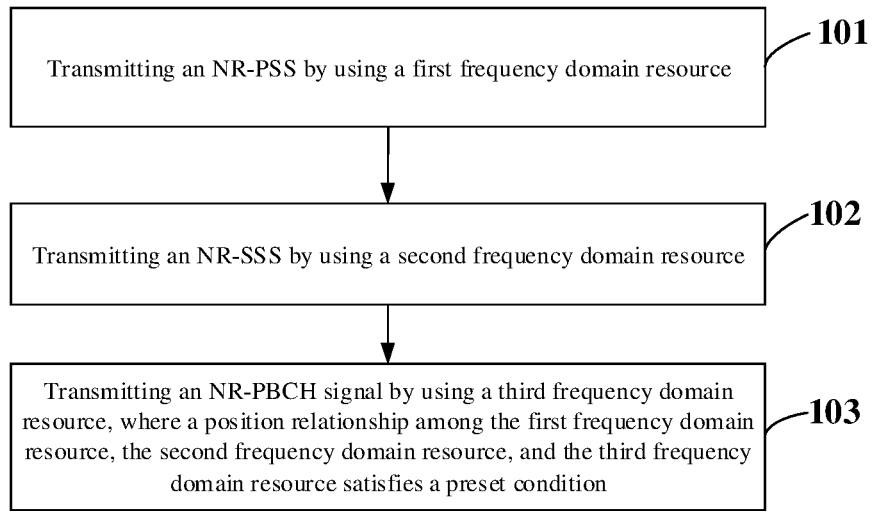
FIG. 1 is a flow diagram of a method of transmitting an SS block on a network equipment side according to an embodiment of the present disclosure.

An embodiment of the present disclosure provides a method of transmitting an SS block, applied to a network equipment side. As shown in FIG. 1, the method specifically includes the following steps.

Step 101: Transmitting an NR-PSS by using a first frequency domain resource.

Step 102: Transmitting an NR-SSS by using a second frequency domain resource.

Step 103: Transmitting an NR-PBCH signal by using a third frequency domain resource, where a position relationship among the first frequency domain resource, the second frequency domain resource, and the third frequency domain resource satisfies a preset condition.

It should be noted that, the foregoing step 101 to step 103 are only one transmission time sequence of the NR-PSS, the NR-SSS, and the NR-PBCH signal in the present disclosure. In other embodiments of the present disclosure, another transmission time sequence may be used to transmit the NR-PSS, the NR-SSS, and the NR-PBCH signal.

An SS block includes the NR-PSS, the NR-SSS, and the NR-PBCH signal. The network equipment transmits frame synchronization information and cell ID information by using the NR-PSS and the NR-SSS, and transmits limited system information required to communicate with a cell and operate normally by using the NR-PBCH signal. The bandwidth of the first frequency domain resource and/or the bandwidth of the second frequency domain resource are/is different from the bandwidth of the third frequency domain resource. The position relationship among the first frequency domain resource, the second frequency domain resource, and the third frequency domain resource satisfies the preset condition.

Optionally, the bandwidth of the first frequency domain resource is the same as the bandwidth of the second frequency domain resource. The bandwidth of the third frequency domain resource is twice the bandwidth of the first frequency domain resource or the second frequency domain resource. Specifically, both the bandwidth of the first frequency domain resource and the bandwidth of the second frequency domain resource are 2.16 M, that is, the NR-PSS and the NR-SSS each have a bandwidth of 2.16 M and occupy 127 subcarriers respectively. The bandwidth of the third frequency domain resource is 4.32 M, that is, the NR-PBCH signal has a bandwidth of 4.32 M and occupies 288 subcarriers.

Optionally, in the present disclosure, a transmission resource for transmitting the SS block may further be mapped to a time domain resource. Specifically, the NR-PSS is transmitted on a first time domain resource by using the first frequency domain resource; the NR-SSS is transmitted on a second time domain resource by using the second frequency domain resource; the NR-PBCH signal is transmitted on a third time domain resource by using the third frequency domain resource.

The SS block includes four consecutive time domain symbols, the NR-PSS and the NR-SSS respectively occupy one time domain symbol, and the NR-PBCH signal occupies two time domain symbols. A position relationship among the first time domain resource, the second time domain resource, and the third time domain resource also needs to satisfy a preset condition.

The position relationship among the first frequency domain resource, the second frequency domain resource, and the third frequency domain resource and the position relationship among the first time domain resource, the second time domain resource, and the third time domain resource are further described below with reference to specific application scenarios and the accompanying drawings.

Scenario 1:

Specifically, to ensure normal transmission of an SS block, the position relationship among the first frequency domain resource, the second frequency domain resource, and the third frequency domain resource needs to satisfy the preset condition. As shown in FIG. 2a to FIG. 2l, the preset condition to be satisfied by the frequency domain resources is: a center frequency of the first frequency domain resource, a center frequency of the second frequency domain resource, and a center frequency of the third frequency domain resource are aligned. Specifically, the center frequency of the first frequency domain resource, the center frequency of the second frequency domain resource, and the center frequency of the third frequency domain resource are the same, the NR-PBCH signal is mapped to 24 central NR-PRBs, and the NR-PSS and the NR-SSS are respectively mapped to 12 central NR-PRBs.

Figure 2A:
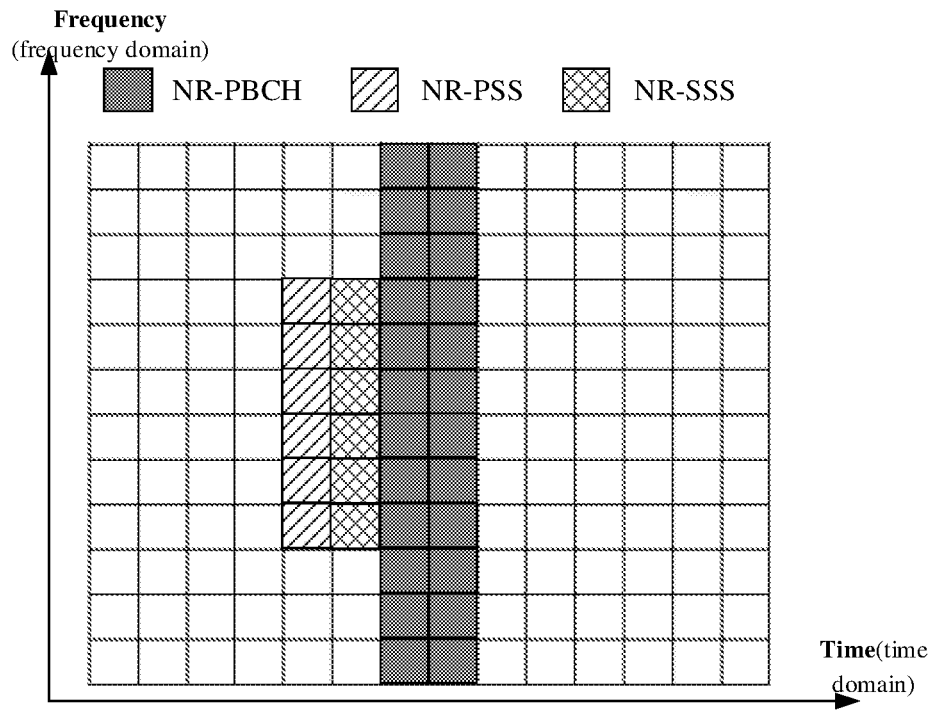
FIG. 2a to FIG. 2l are schematic diagrams of resource mapping of SS blocks in a scenario 1 according to embodiments of the present disclosure.
Figure 2B:
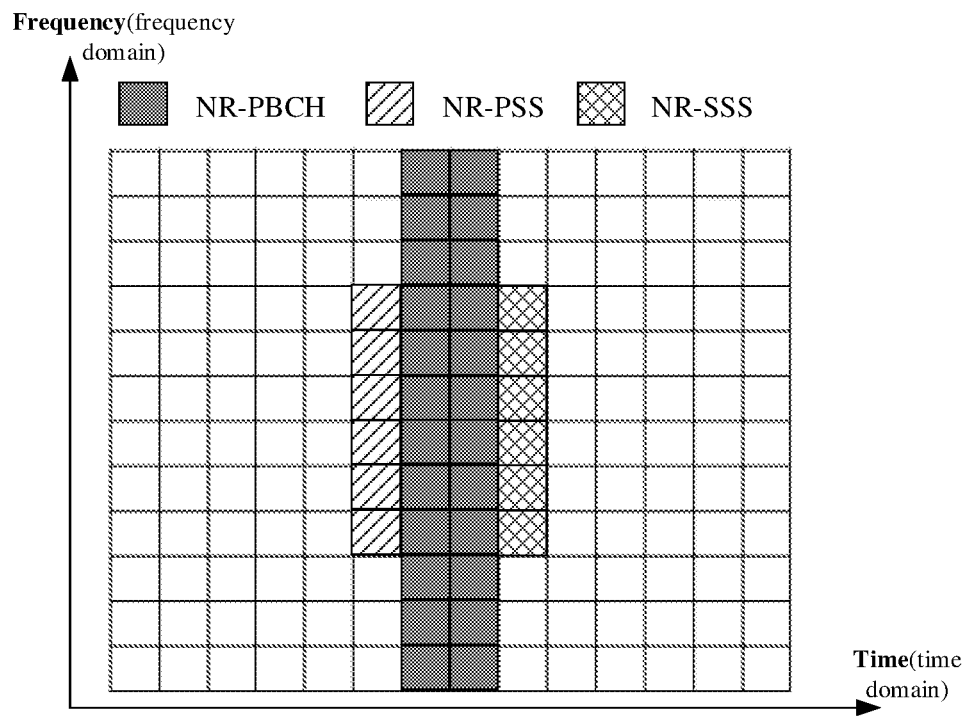
Figure 2C:
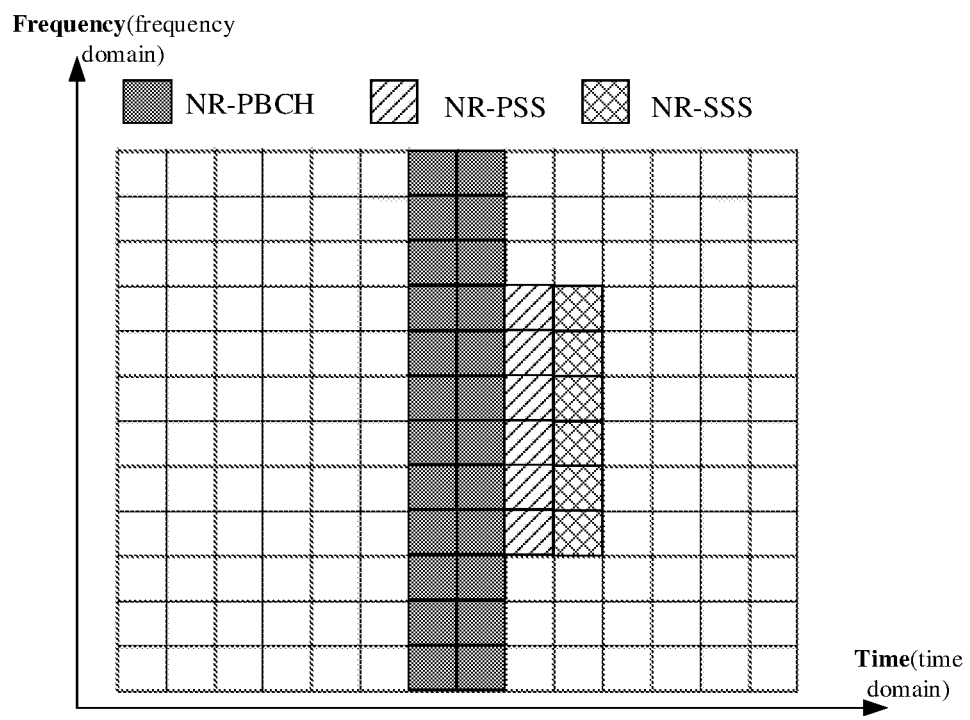
Figure 2D:
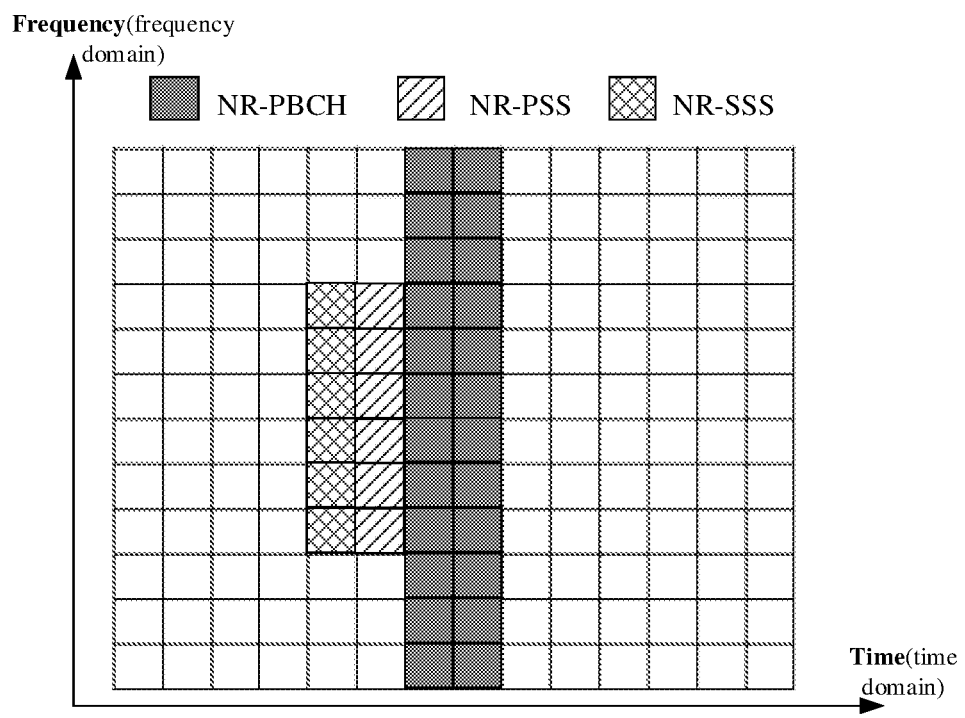
Figure 2E:
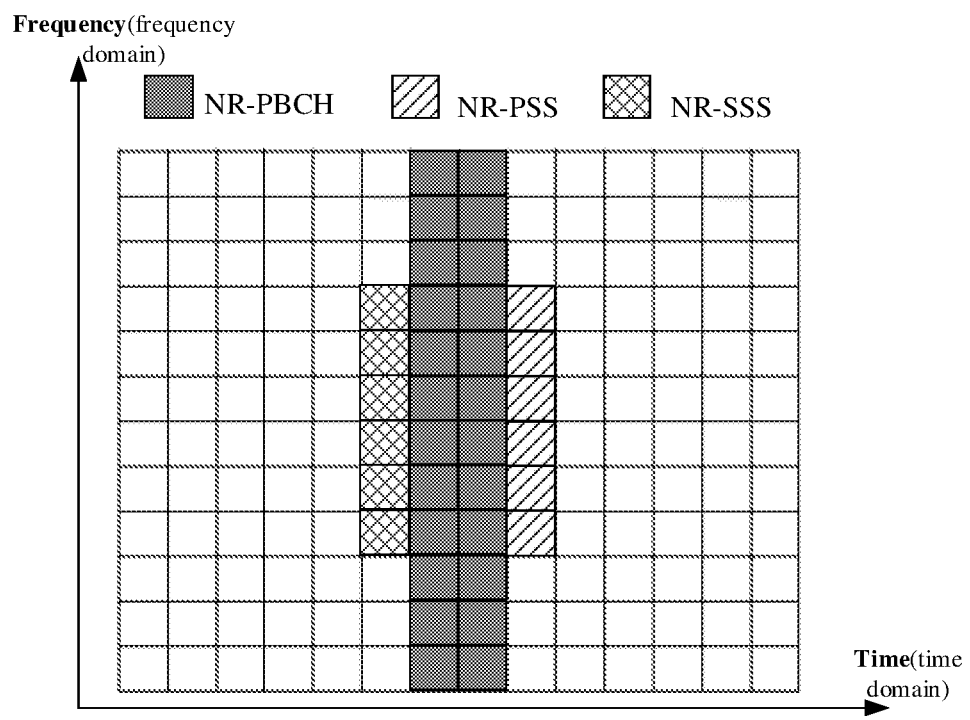
Figure 2F:
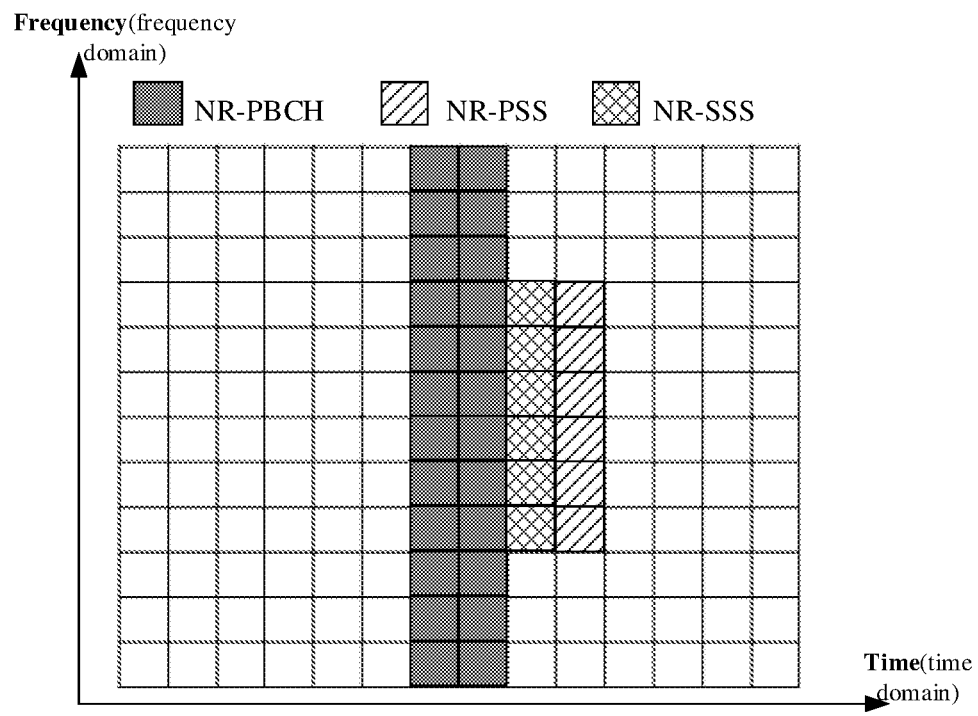

Specifically, as shown in FIG. 2a to FIG. 2f, the third time domain resource for transmitting the NR-PBCH signal is consecutive time domain symbols. That is, the NR-PBCH signal is mapped to two consecutive time domain symbols. Further, as shown in FIG. 2a to FIG. 2c, the first time domain resource for transmitting the NR-PSS is located before the second time domain resource for transmitting the NR-SSS. That is, for the same SS block, the time domain symbols to which the NR-PBCH signal is mapped are consecutive, and the time domain symbol to which the NR-PSS is mapped is located before the time domain symbol to which the NR-SSS signal is mapped. As shown in FIG. 2d to FIG. 2f, the second time domain resource for transmitting the NR-SSS is located before the first time domain resource for transmitting the NR-PSS signal. That is, for the same SS block, the time domain symbols to which the NR-PBCH signal is mapped are consecutive, and the time domain symbol to which the NR-PSS is mapped is located after the time domain symbol to which the NR-SSS is mapped.

Figure 2G:
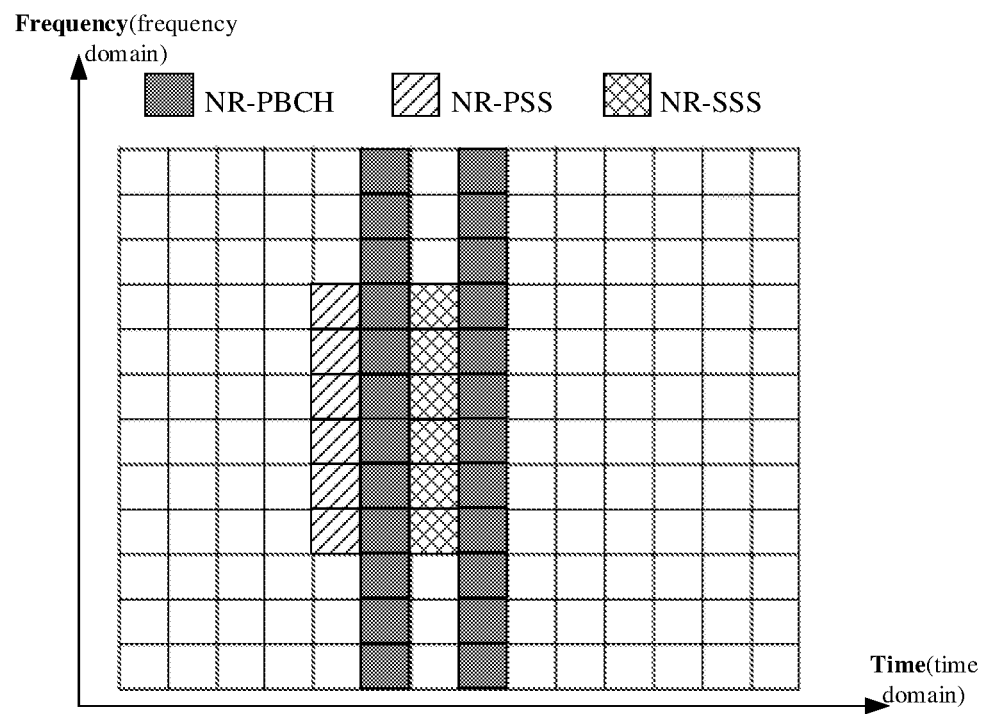
Figure 2H:
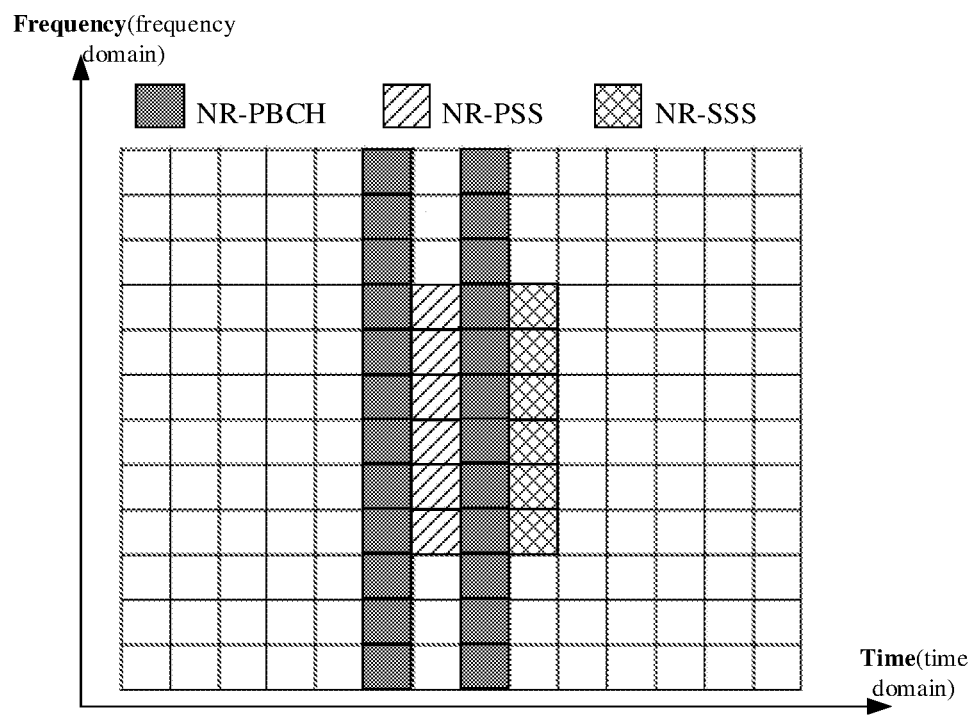
Figure 2I:
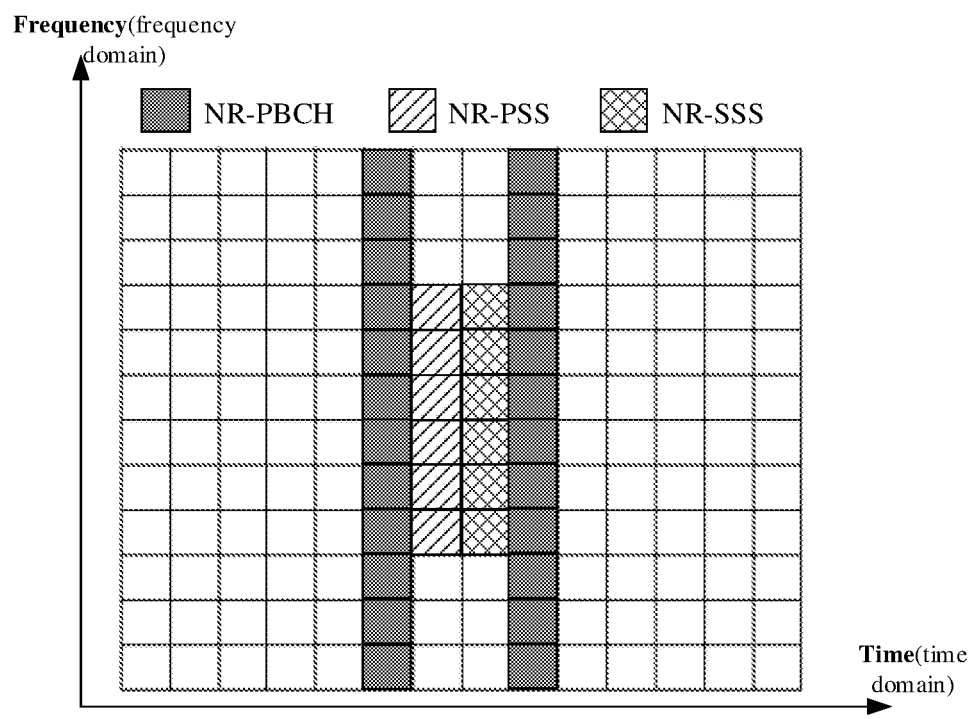
Figure 2J:
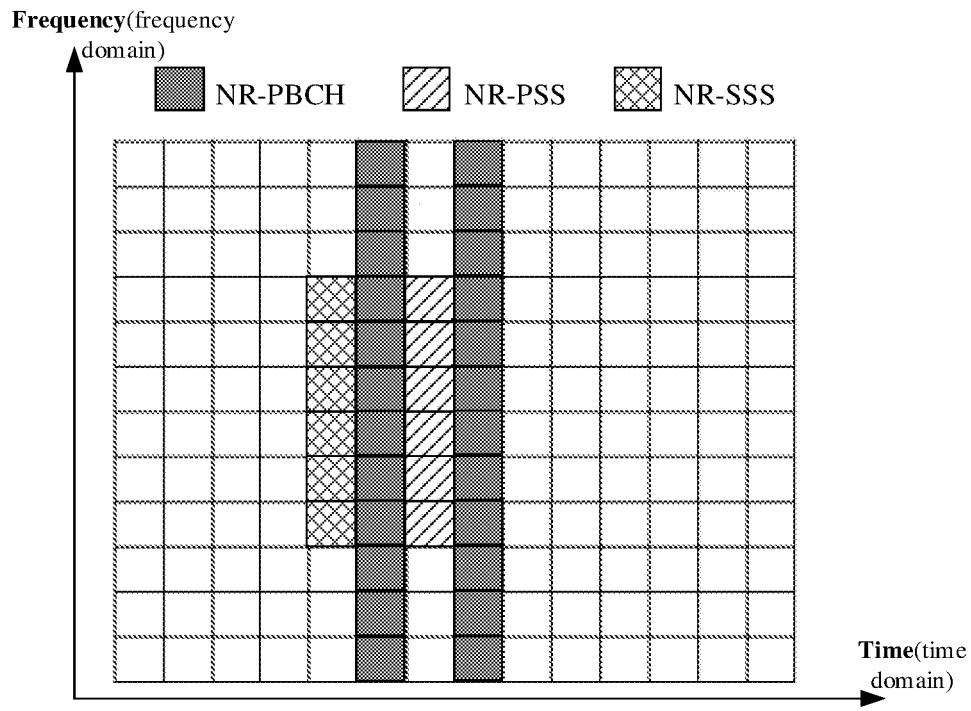
Figure 2K:
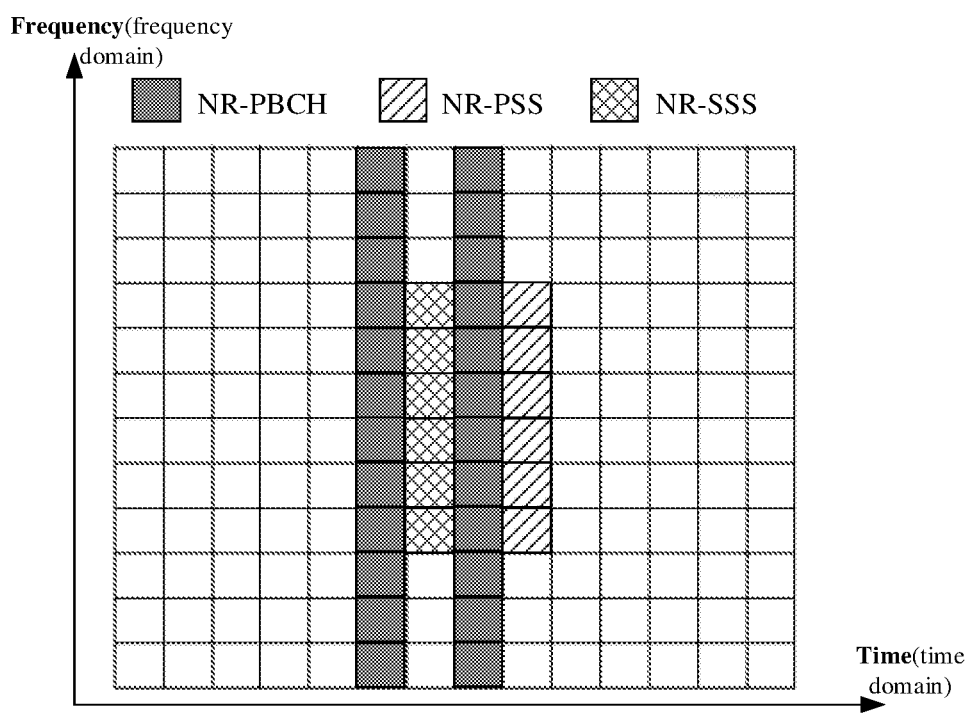
Figure 2L:
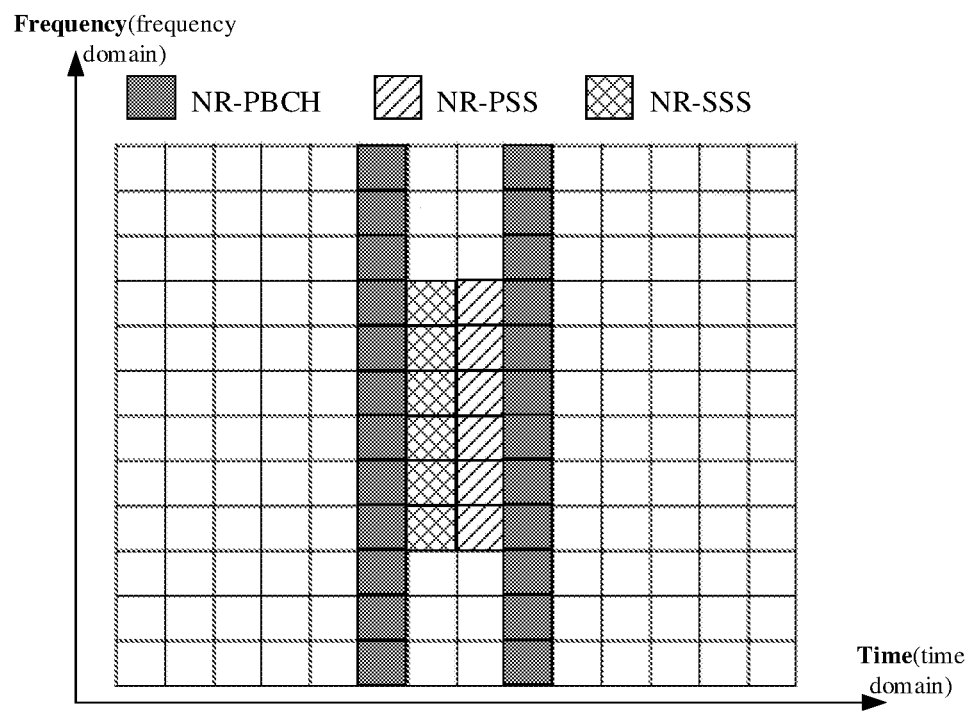

Specifically, as shown in FIG. 2g to FIG. 2l, the third time domain resource for transmitting the NR-PBCH signal is non-consecutive time domain symbols. That is, the NR-PBCH signal is mapped to two non-consecutive time domain symbols. Further, as shown in FIG. 2g to FIG. 2i, the first time domain resource for transmitting the NR-PSS is located before the second time domain resource for transmitting the NR-SSS. That is, for the same SS block, the time domain symbols to which the physical broadcast channel signal is mapped are not consecutive, and the time domain symbol to which the NR-PSS is mapped is located before the time domain symbol to which the NR-SSS is mapped. As shown in FIG. 2j to FIG. 2l, the second time domain resource for transmitting the NR-SSS is located before the first time domain resource for transmitting the NR-PSS. That is, for the same SS block, the time domain symbols to which the NR-PBCH signal is mapped are not consecutive, and the time domain symbol to which the NR-PSS is mapped is located after the time domain symbol to which the NR-SSS is mapped.

Scenario 2:

Specifically, to ensure normal transmission of an SS block, the position relationship among the first frequency domain resource, the second frequency domain resource, and the third frequency domain resource needs to satisfy the preset condition. As shown in FIG. 3a to FIG. 3l, the preset condition to be satisfied by the frequency domain resources is: the first frequency domain resource, the second frequency domain resource, and the third frequency domain resource are aligned at a high frequency. Specifically, a center frequency of the first frequency domain resource and a center frequency of the second frequency domain resource are different from a center frequency of the third frequency domain resource, the NR-PBCH signal is mapped to 24 central NR-PRBs, and the NR-PSS and the NR-SSS are located in 12 NR-PRBs extended from a center frequency to a higher frequency.

Figure 3A:
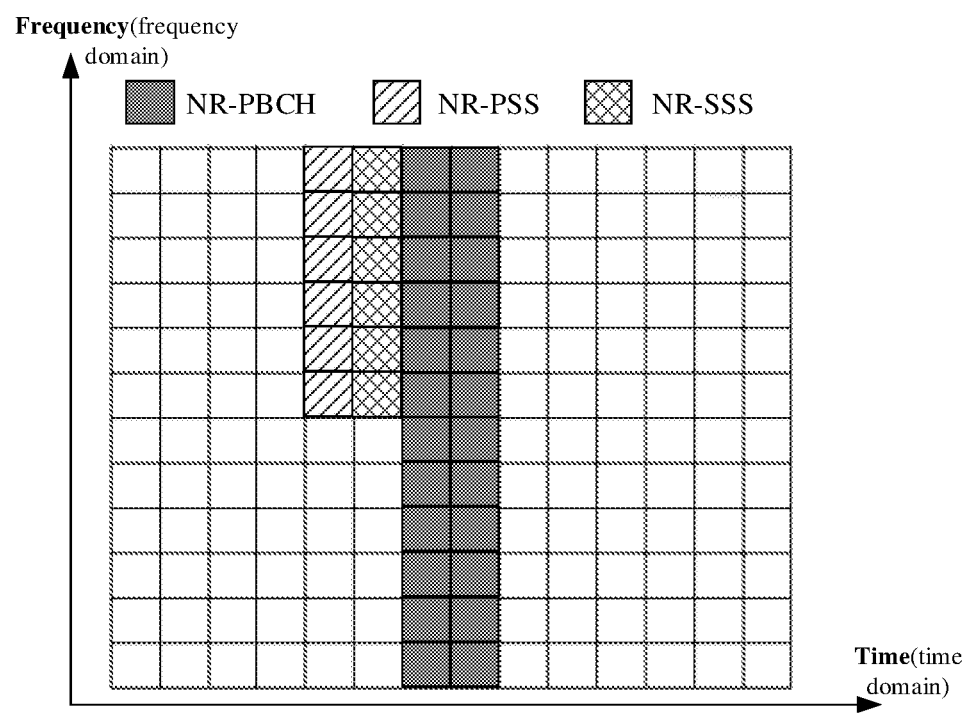
FIG. 3a to FIG. 3l are schematic diagrams of resource mapping of SS blocks in a scenario 2 according to embodiments of the present disclosure.
Figure 3B:
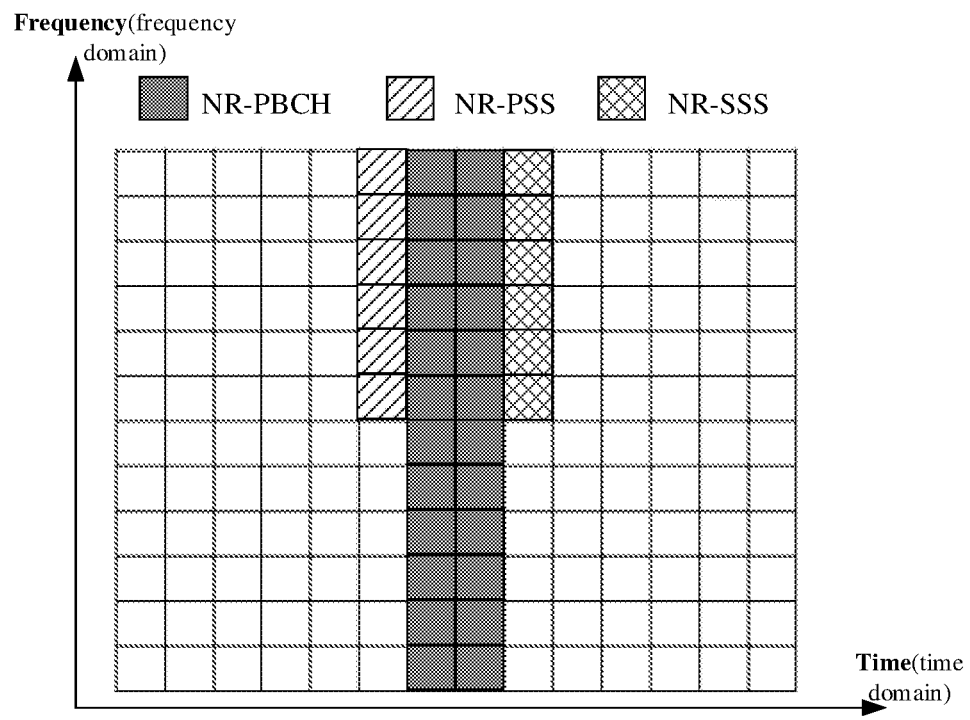
Figure 3C:
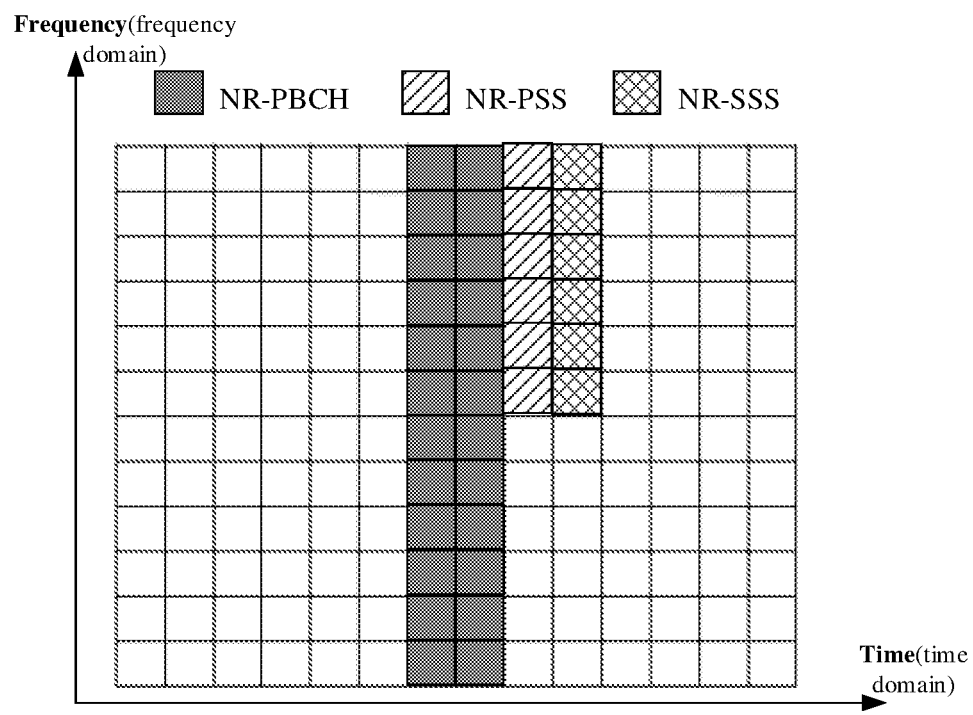
Figure 3D:
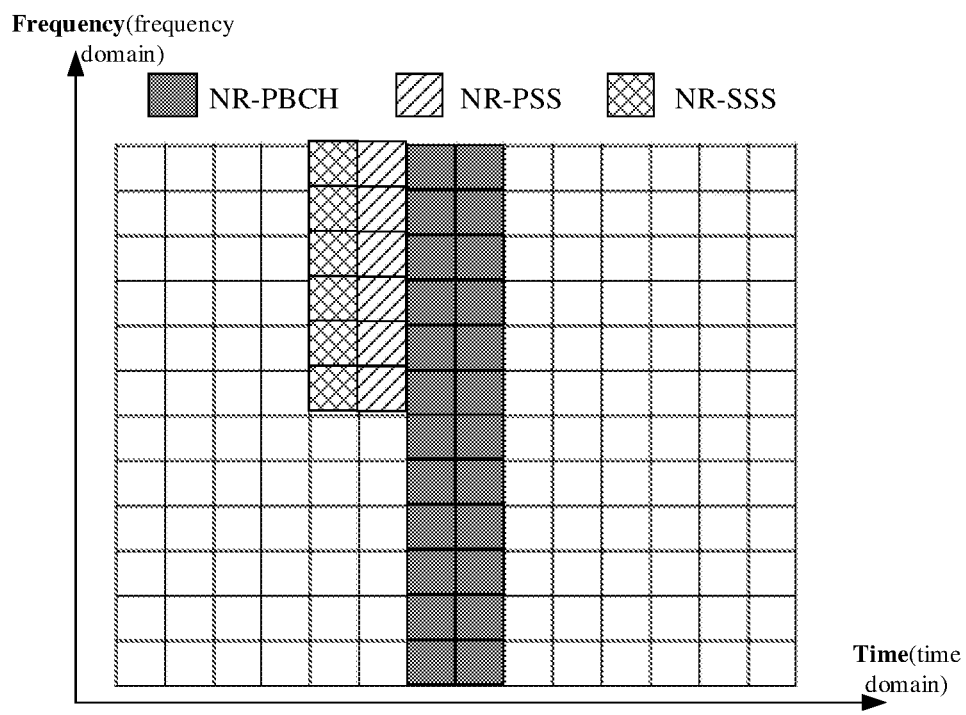
Figure 3E:
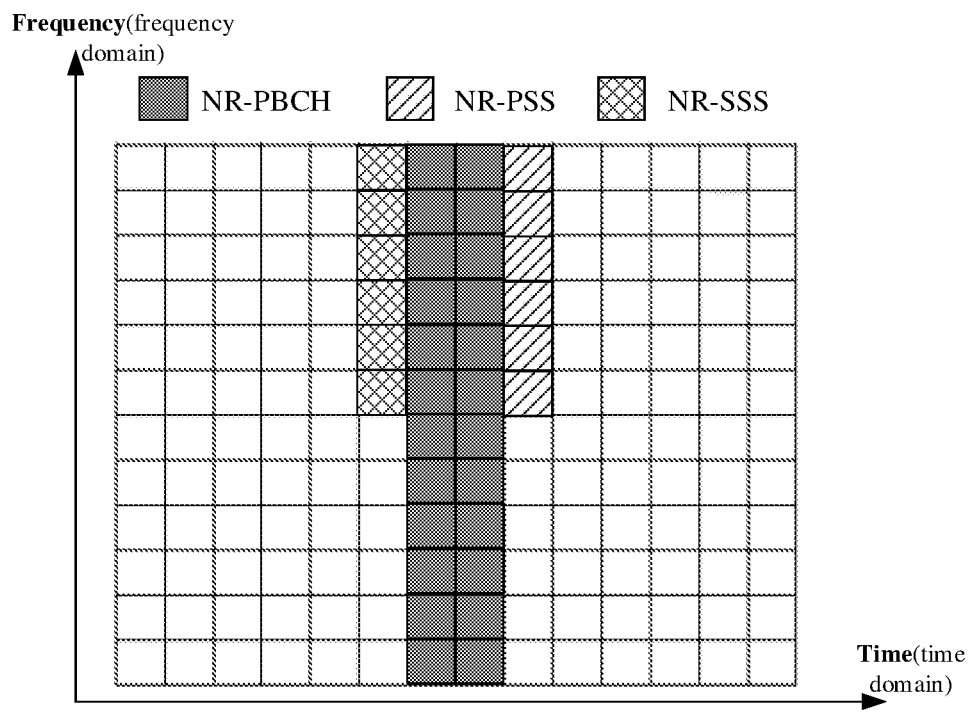
Figure 3F:
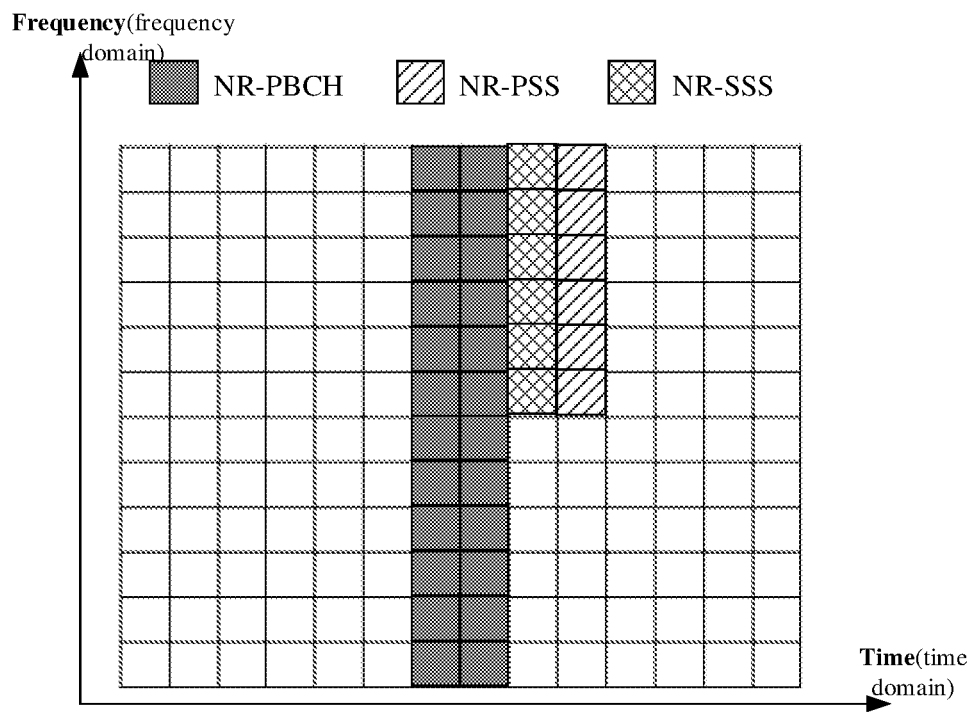

Specifically, as shown in FIG. 3a to FIG. 3f, the third time domain resource for transmitting the NR-PBCH signal is consecutive time domain symbols. That is, the NR-PBCH signal is mapped to two consecutive time domain symbols. Further, as shown in FIG. 3a to FIG. 3c, the first time domain resource for transmitting the NR-PSS is located before the second time domain resource for transmitting the NR-SSS. That is, for the same SS block, the time domain symbols to which the NR-PBCH signal is mapped are consecutive, and the time domain symbol to which the NR-PSS is mapped is located before the time domain symbol to which the NR-SSS is mapped. As shown in FIG. 3d to FIG. 3f, the second time domain resource for transmitting the NR-SSS is located before the first time domain resource for transmitting the NR-PSS. That is, for the same SS block, the time domain symbols to which the NR-PBCH signal is mapped are consecutive, and the time domain symbol to which the NR-PSS is mapped is located after the time domain symbol to which the NR-SSS is mapped.

Figure 3G:
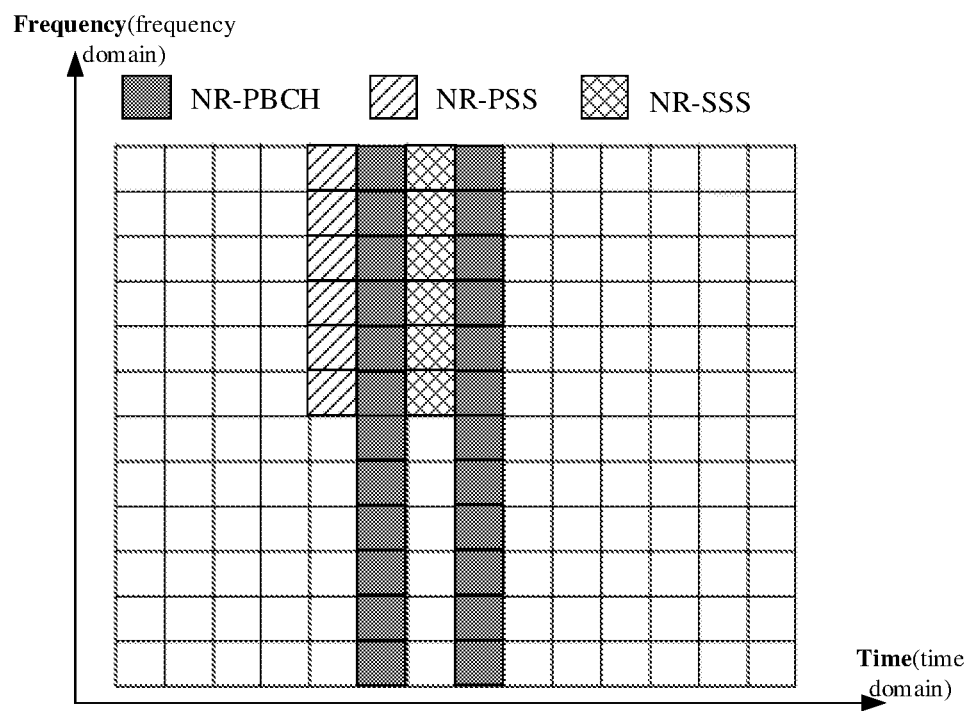
Figure 3H:
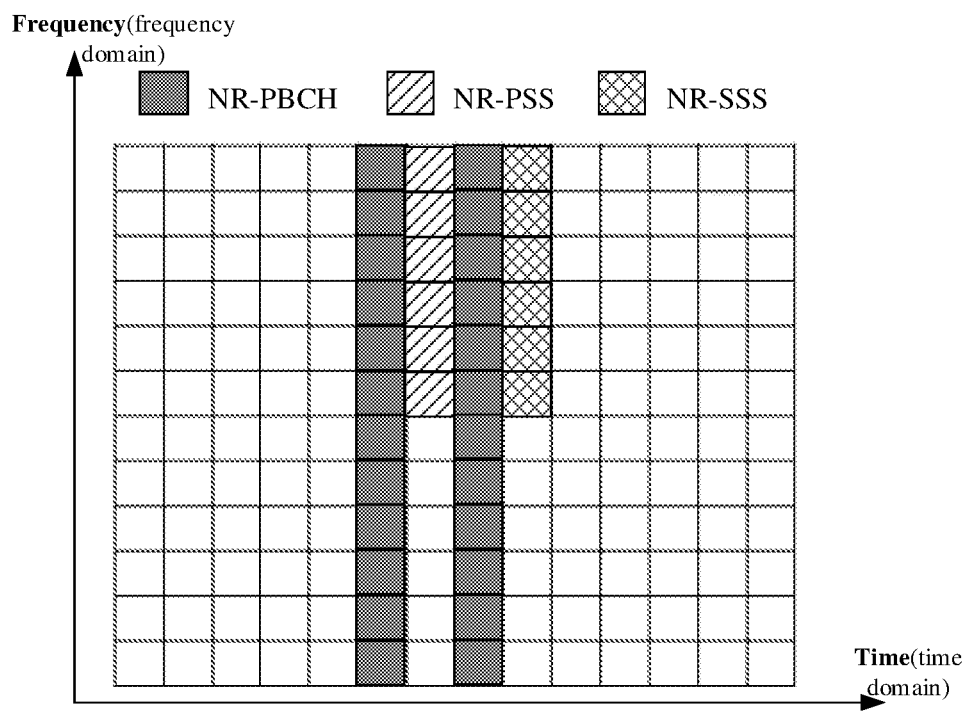
Figure 3I:
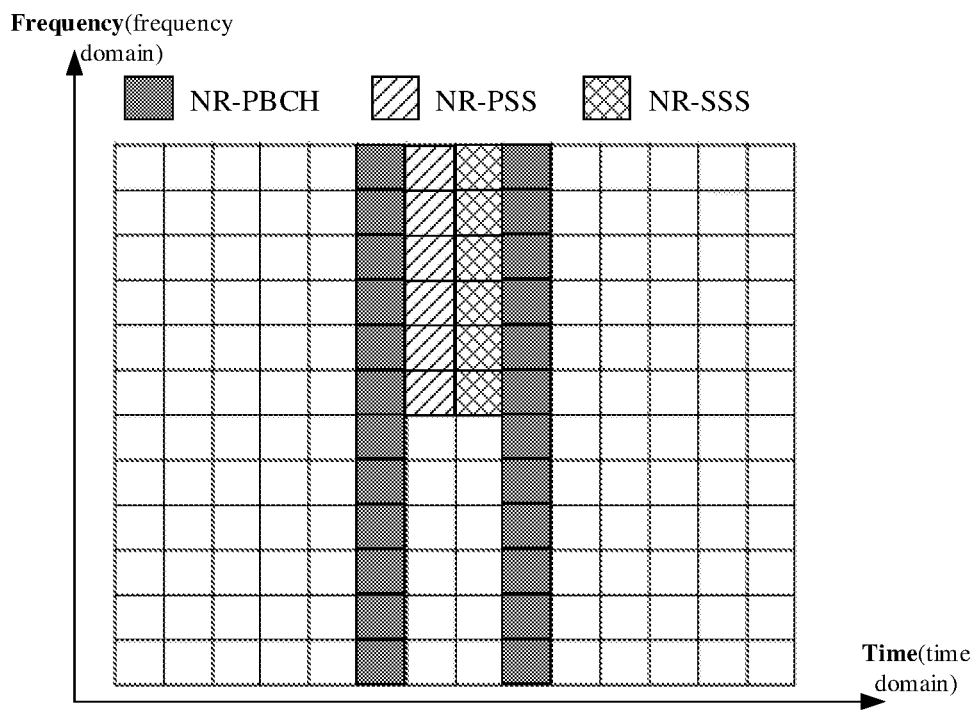
Figure 3J:
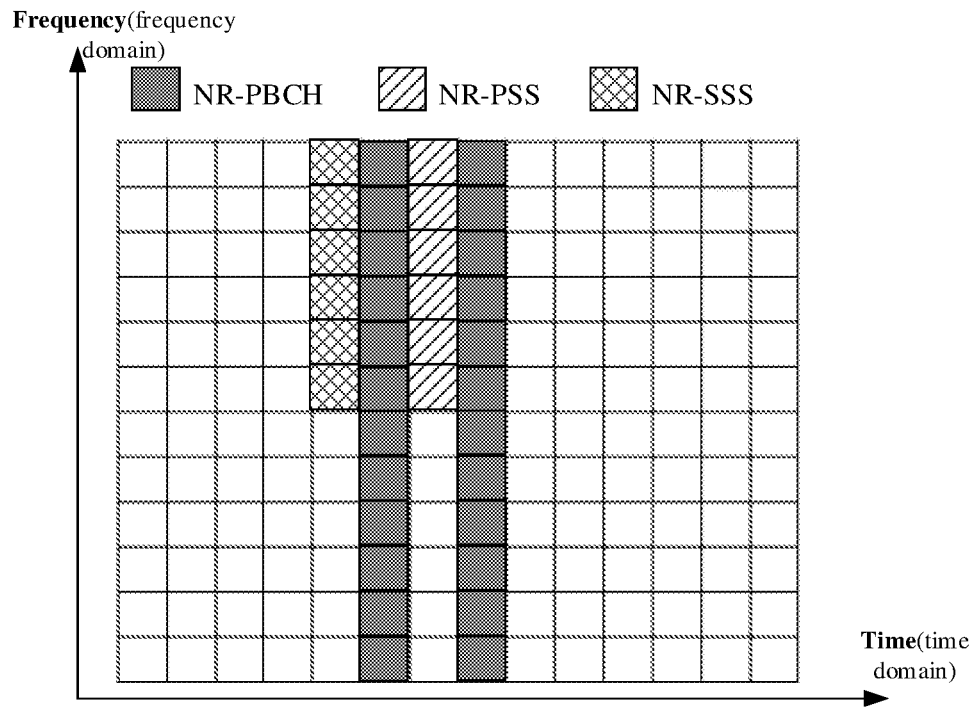
Figure 3K:
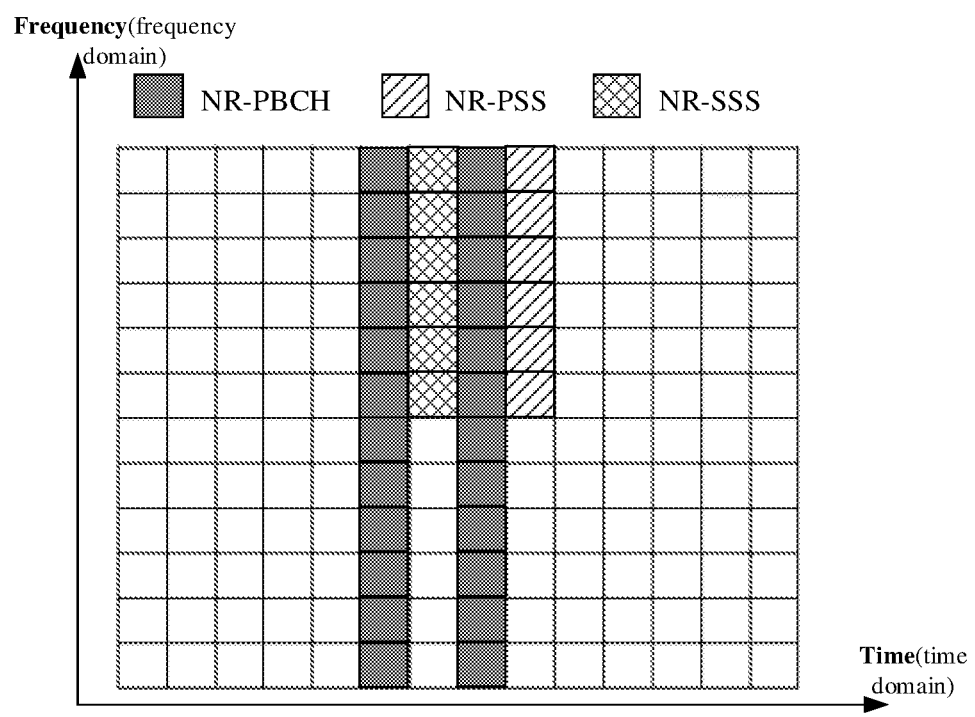
Figure 3L:
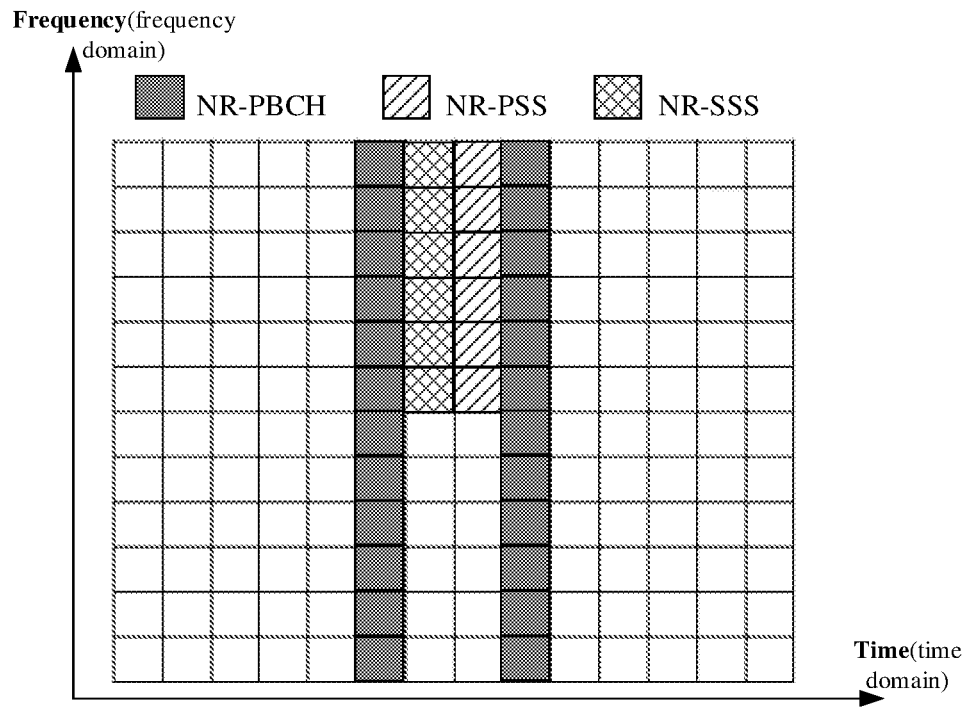

Specifically, as shown in FIG. 3g to FIG. 3l, the third time domain resource for transmitting the NR-PBCH signal is non-consecutive time domain symbols. That is, the NR-PBCH signal is mapped to two non-consecutive time domain symbols. Further, as shown in FIG. 3g to FIG. 3i, the first time domain resource for transmitting the NR-PSS is located before the second time domain resource for transmitting the NR-SSS. That is, for the same SS block, the time domain symbols to which the NR-PBCH signal is mapped are not consecutive, and the time domain symbol to which the NR-PSS is mapped is located before the time domain symbol to which the NR-SSS is mapped. As shown in FIG. 3j to FIG. 3l, the second time domain resource for transmitting the NR-SSS is located before the first time domain resource for transmitting the NR-PSS. That is, for the same SS block, the time domain symbols to which the NR-PBCH signal is mapped are not consecutive, and the time domain symbol to which the NR-PSS is mapped is located after the time domain symbol to which the NR-SSS is mapped.

Scenario 3:

Specifically, to ensure normal transmission of an SS block, the position relationship among the first frequency domain resource, the second frequency domain resource, and the third frequency domain resource needs to satisfy the preset condition. As shown in FIG. 4a to FIG. 4l, the preset condition to be satisfied by the frequency domain resources is: the first frequency domain resource, the second frequency domain resource, and the third frequency domain resource are aligned at a low frequency. Specifically, a center frequency of the first frequency domain resource and a center frequency of the second frequency domain resource are different from a center frequency of the third frequency domain resource. The NR-PBCH signal is mapped to 24 central NR-PRBs, and the NR-PSS and the NR-SSS are located in 12 NR-PRBs extended from a center frequency to a lower frequency.

Figure 4A:
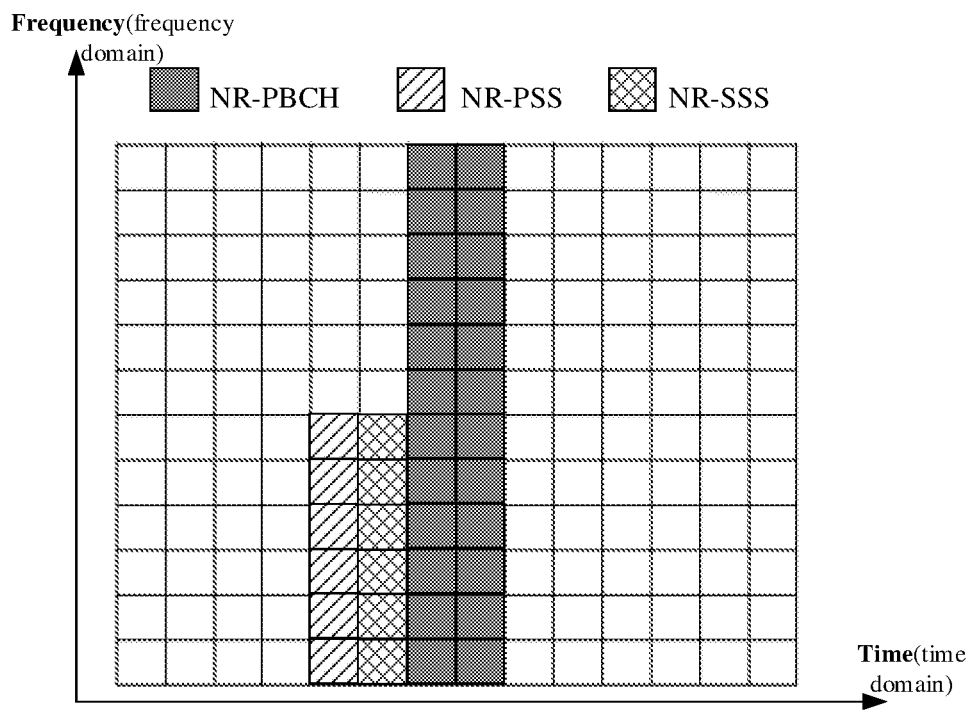
FIG. 4a to FIG. 4l are schematic diagrams of resource mapping of SS blocks in a scenario 3 according to embodiments of the present disclosure.
Figure 4B:
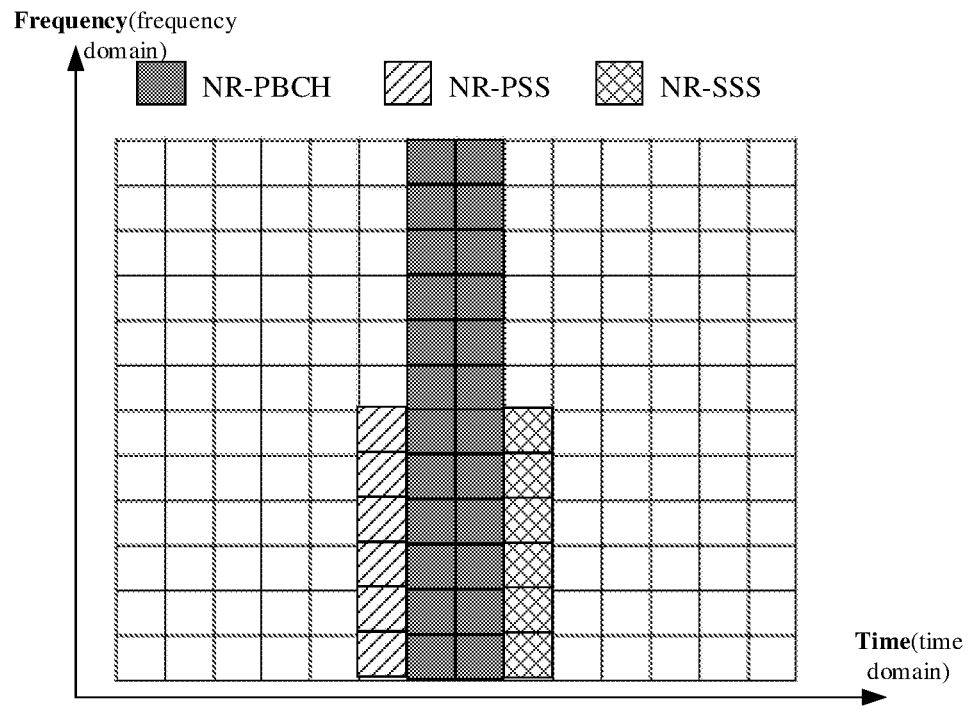
Figure 4C:
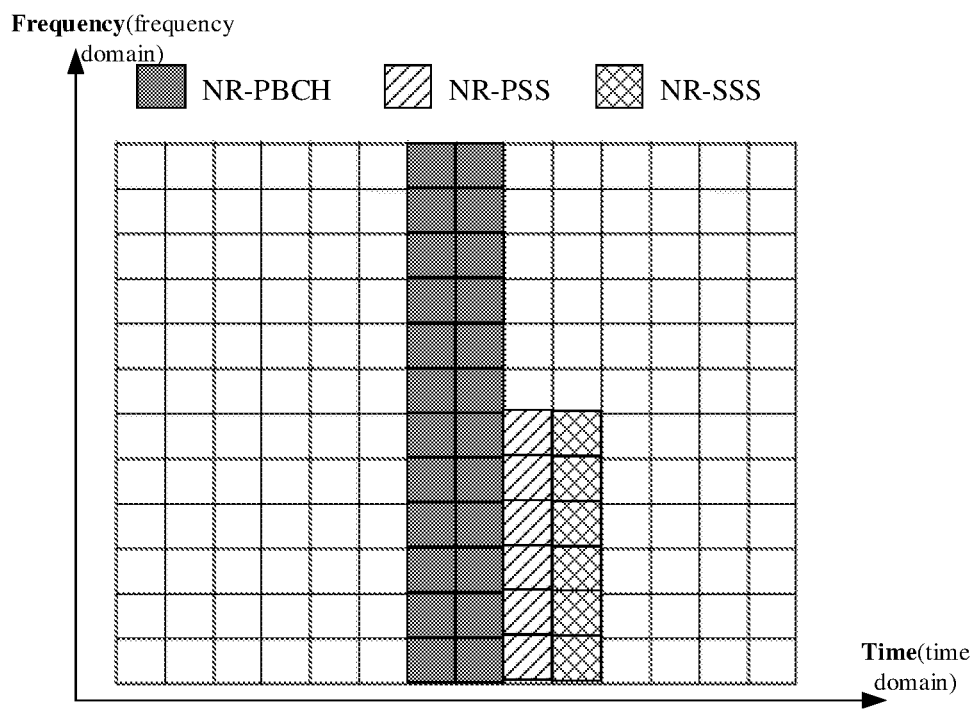
Figure 4D:
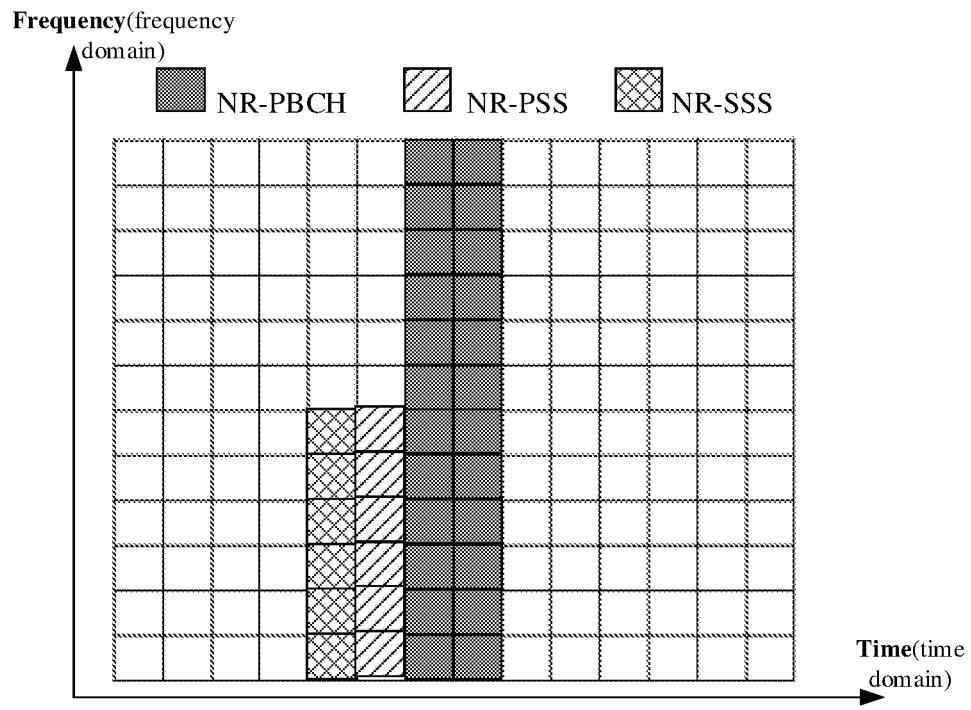
Figure 4E:
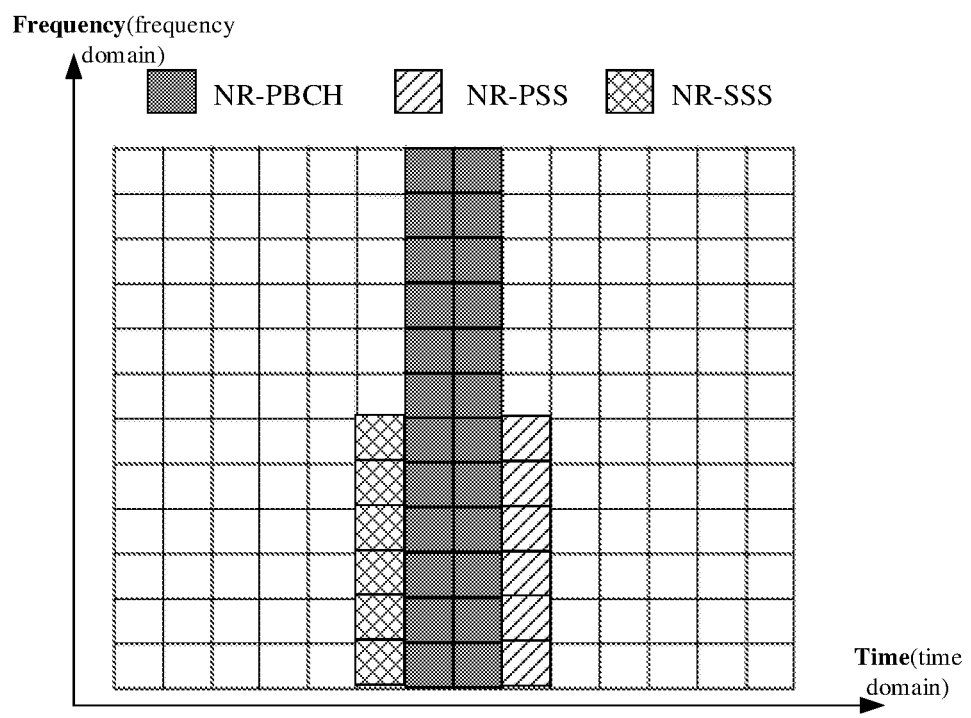
Figure 4F:
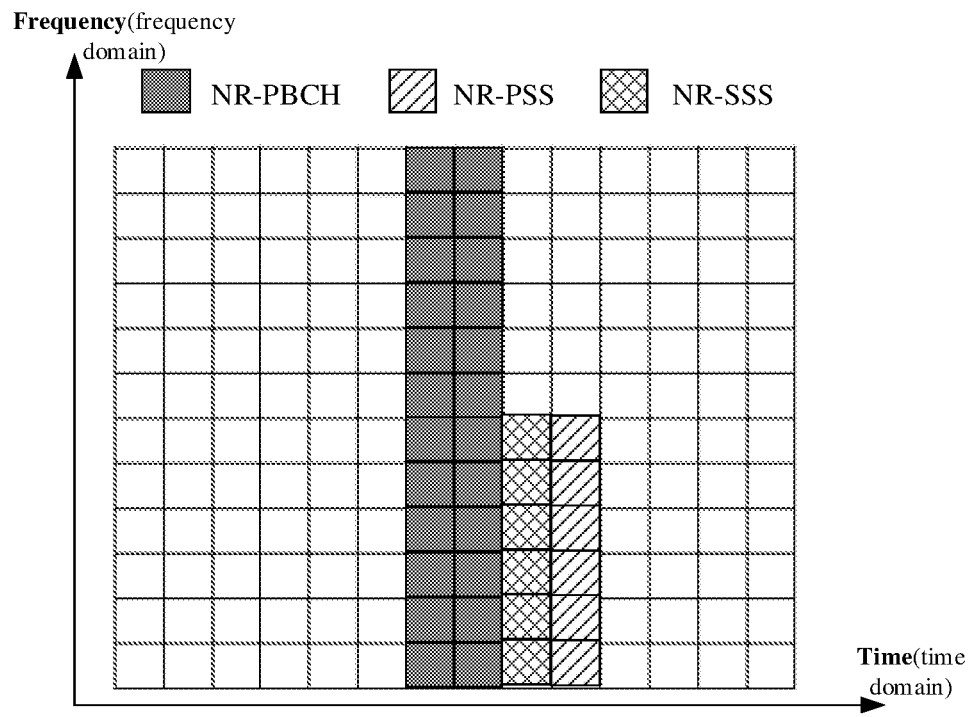

Specifically, as shown in FIG. 4a to FIG. 4f, the third time domain resource for the NR-PBCH channel signal is consecutive time domain symbols. That is, the NR-PBCH signal is mapped to two consecutive time domain symbols. Further, as shown in FIG. 4a to FIG. 4c, the first time domain resource for transmitting the NR-PSS is located before the second time domain resource for transmitting the NR-SSS. That is, for the same SS block, the time domain symbols to which the NR-PBCH is mapped are consecutive, and the time domain symbol to which the NR-PSS is mapped is located before the time domain symbol to which the NR-SSS is mapped. As shown in FIG. 4d to FIG. 4f, the second time domain resource for transmitting the NR-SSS is located before the first time domain resource for transmitting the NR-PSS. That is, for the same SS block, the time domain symbols to which the NR-PBCH signal is mapped are consecutive, and the time domain symbol to which the NR-PSS is mapped is located after the time domain symbol to which the NR-SSS is mapped.

Figure 4G:
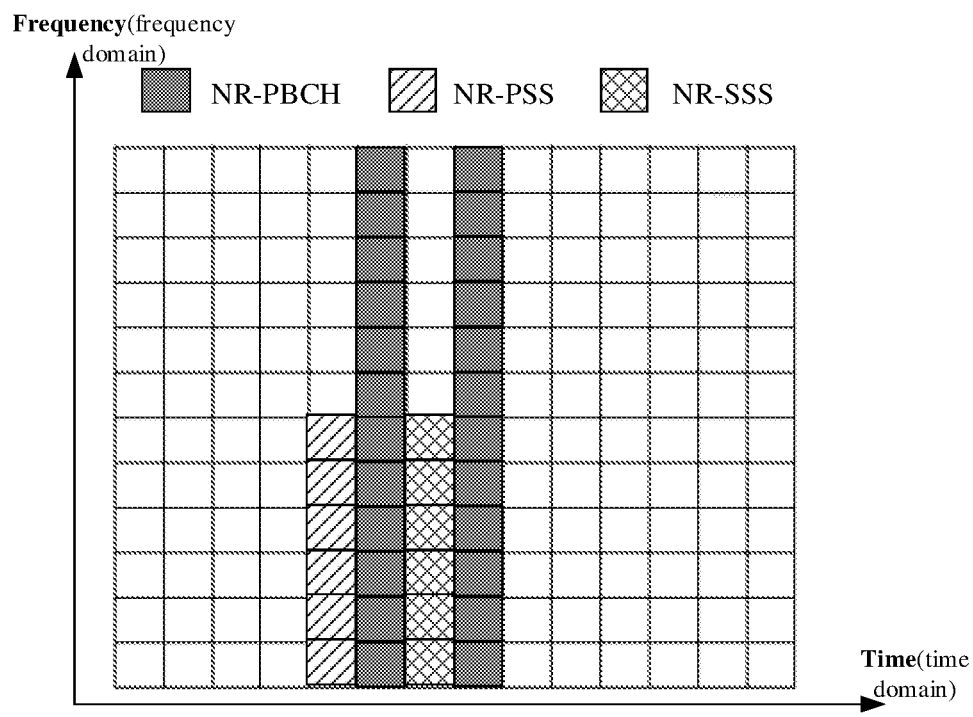
Figure 4H:
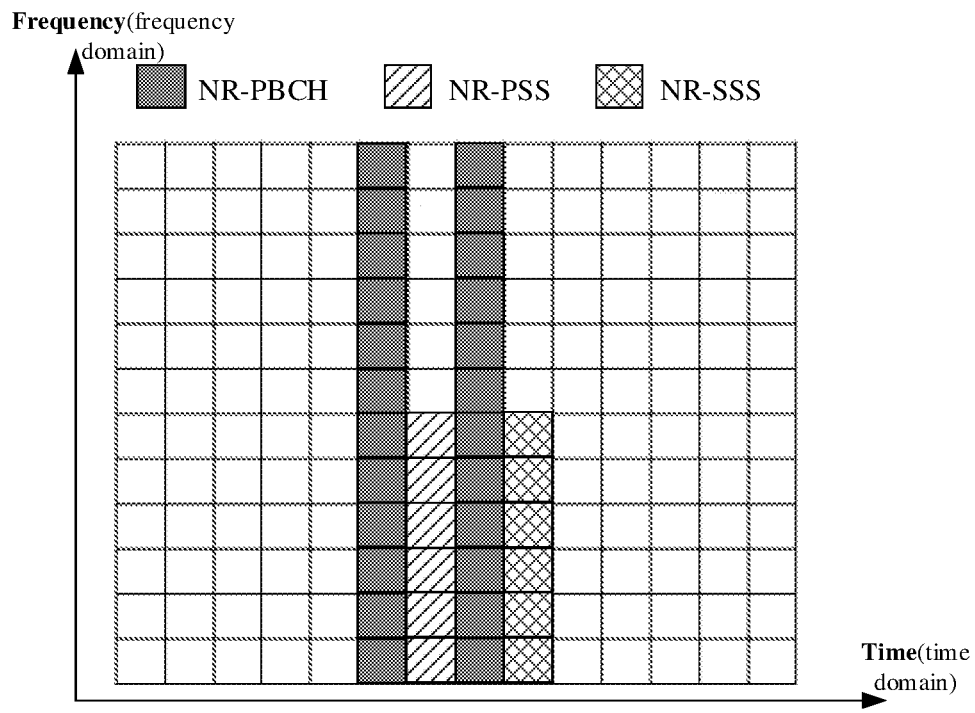
Figure 4I:
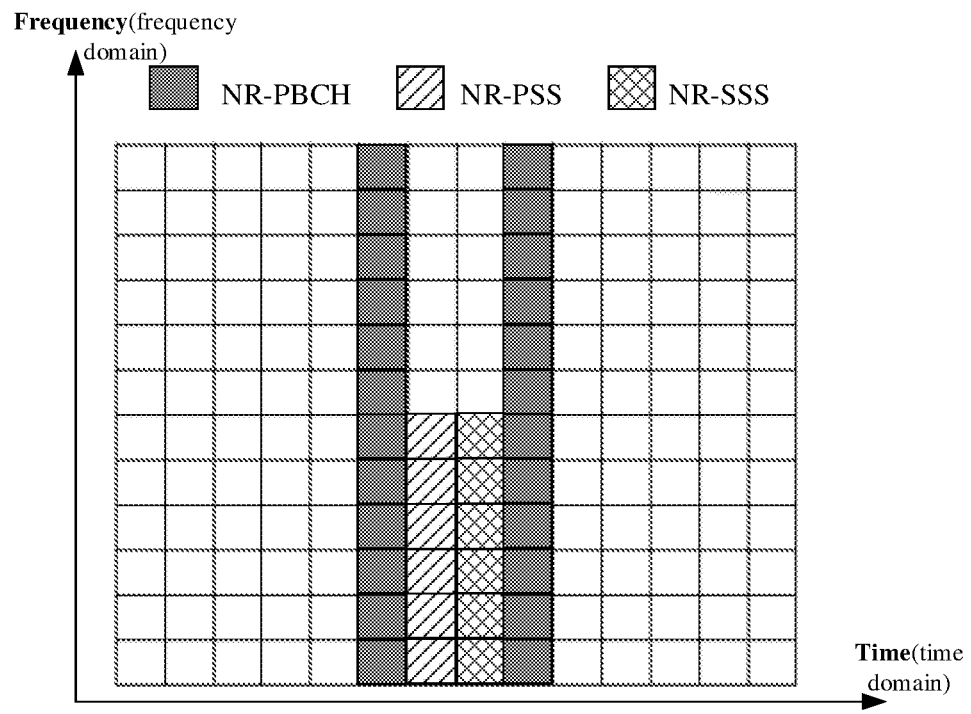
Figure 4J:
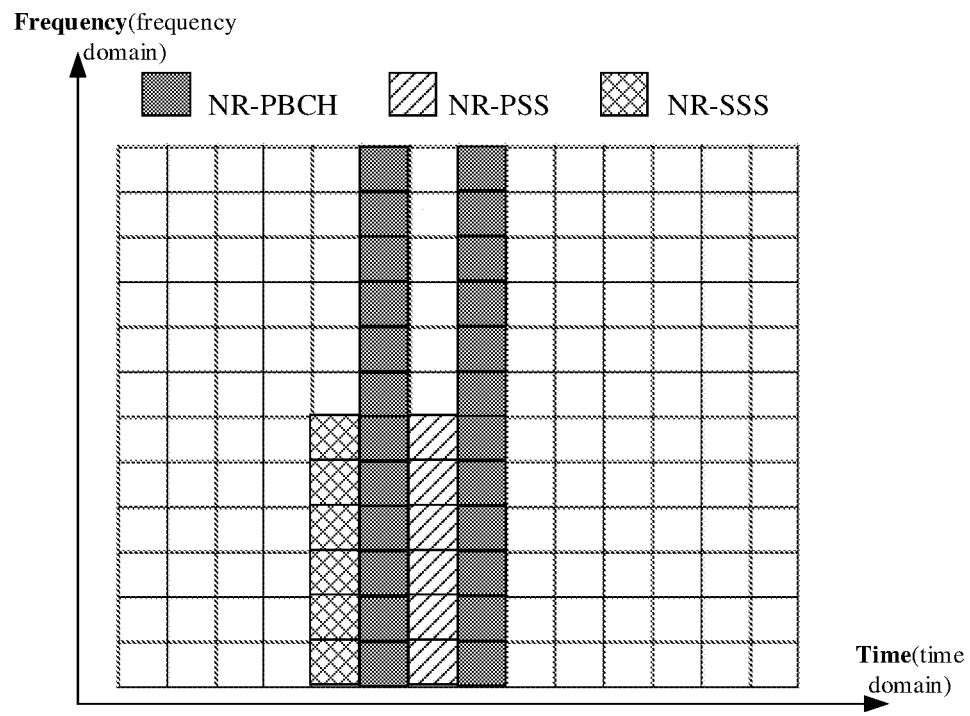
Figure 4K:
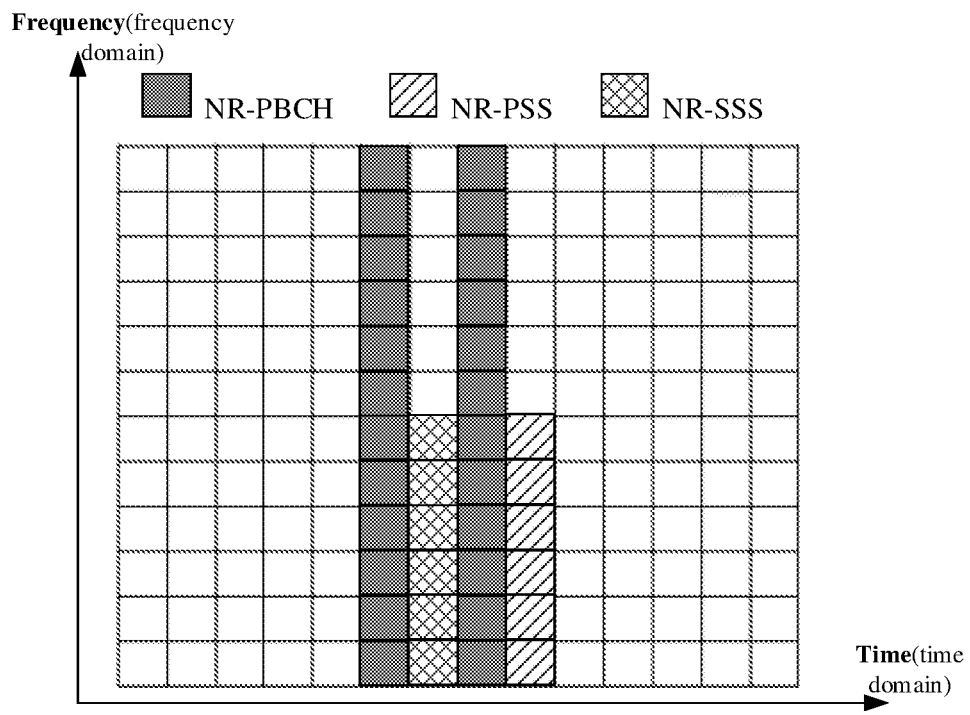
Figure 4L:
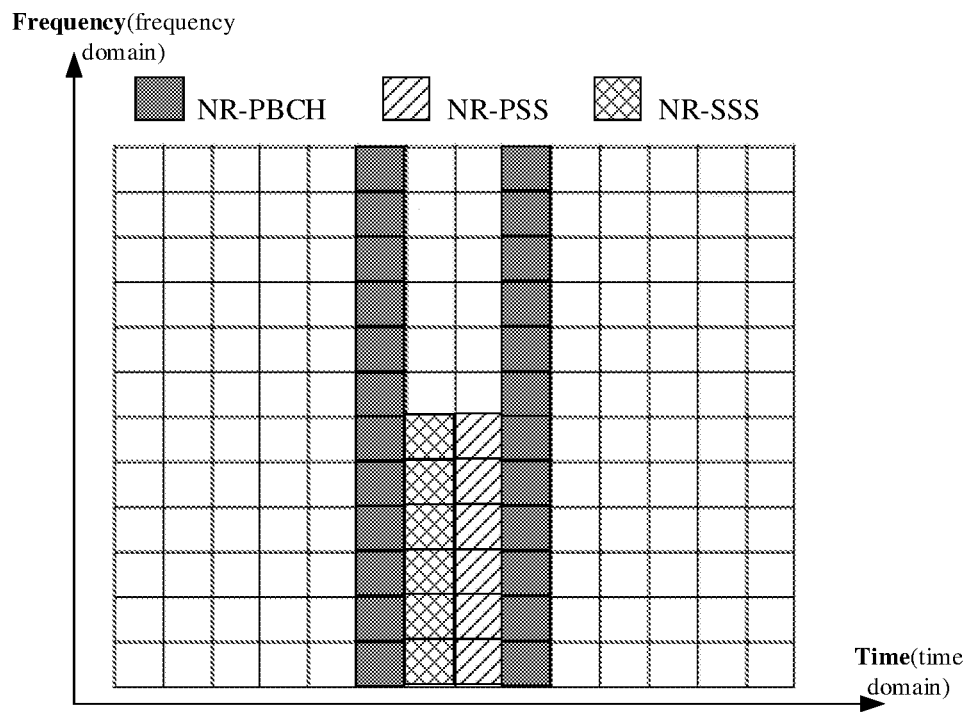

Specifically, as shown in FIG. 4g to FIG. 4l, the third time domain resource for transmitting the NR-PBCH signal is non-consecutive time domain symbols. That is, the NR-PBCH signal is mapped to two non-consecutive time domain symbols. Further, as shown in FIG. 4g to FIG. 4i, the first time domain resource for transmitting the NR-PSS is located before the second time domain resource for transmitting the NR-SSS. That is, for the same SS block, the time domain symbols to which the NR-PBCH signal is mapped are not consecutive, and the time domain symbol to which the NR-PSS is mapped is located before the time domain symbol to which the NR-SSS is mapped. As shown in FIG. 4j to FIG. 4l, the second time domain resource for transmitting the NR-SSS is located before the first time domain resource for transmitting the NR-PSS. That is, for the same SS block, the time domain symbols to which the NR-PBCH signal is mapped are not consecutive, and the time domain symbol to which the NR-PSS is mapped is located after the time domain symbol to which the NR-SSS is mapped.

Scenario 4:

Specifically, to ensure normal transmission of an SS block, the position relationship among the first frequency domain resource, the second frequency domain resource, and the third frequency domain resource needs to satisfy the preset condition. The preset condition to be satisfied by the frequency domain resources is: one of the first frequency domain resource and the second frequency domain resource is aligned with the third frequency domain resource at a low frequency, and the other of the first frequency domain resource and the second frequency domain resource is aligned with the third frequency domain resource at a high frequency. That is, the first frequency domain resource is aligned with the third frequency domain resource at a low frequency, and the second frequency domain resource is aligned with the third frequency domain resource at a high frequency; alternatively, the second frequency domain resource is aligned with the third frequency domain resource at a low frequency, and the first frequency domain resource is aligned with the third frequency domain resource at a high frequency. That is, as shown in FIG. 5a to FIG. 5l, the first frequency domain resource is aligned with the third frequency domain resource at a low frequency, and the second frequency domain resource is aligned with the third frequency domain resource at a high frequency. Specifically, a center frequency of the first frequency domain resource and a center frequency of the second frequency domain resource are different from a center frequency of the third frequency domain resource, the NR-PBCH signal is mapped to 24 central NR-PRBs, the NR-PSS is located in 12 NR-PRBs extended from a center frequency to a lower frequency, and the NR-SSS is located in 12 NR-PRBs extended from a center frequency to a higher frequency. Alternatively, as shown in FIG. 6a to FIG. 6l, the second frequency domain resource is aligned with the third frequency domain resource at a low frequency, and the first frequency domain resource is aligned with the third frequency domain resource at a high frequency. Specifically, the NR-SSS is located in 12 NR-PRBs extended from a center frequency to a lower frequency, and the NR-PSS is located in 12 NR-PRBs extended from a center frequency to a higher frequency.

Figure 5A:
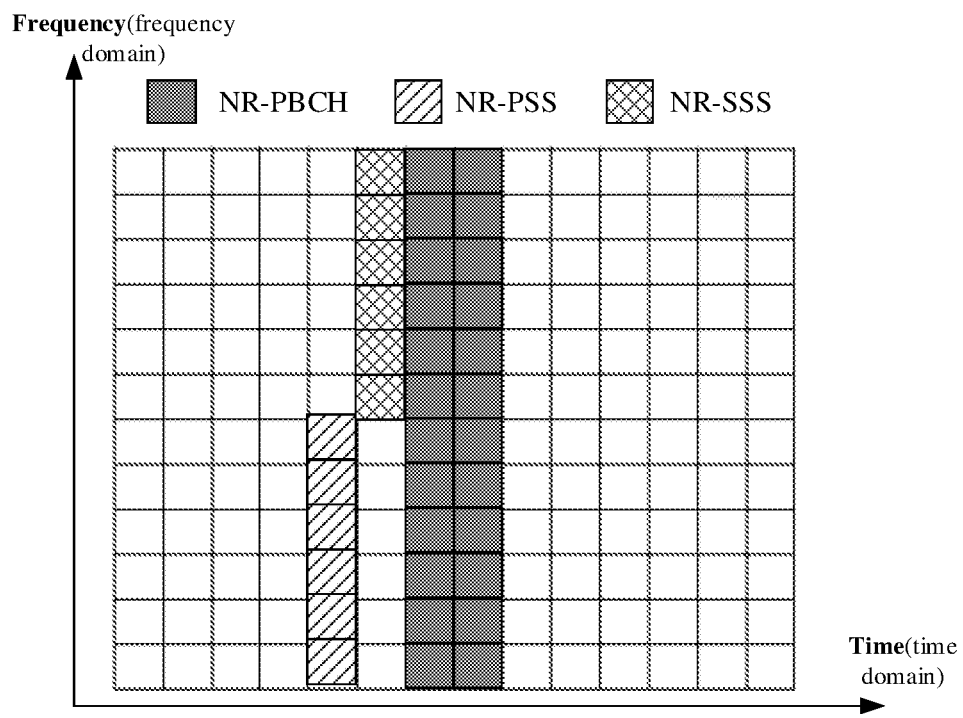
FIG. 5a to FIG. 5l are a first group of schematic diagrams of resource mapping of SS blocks in a scenario 4 according to embodiments of the present disclosure.
Figure 5B:
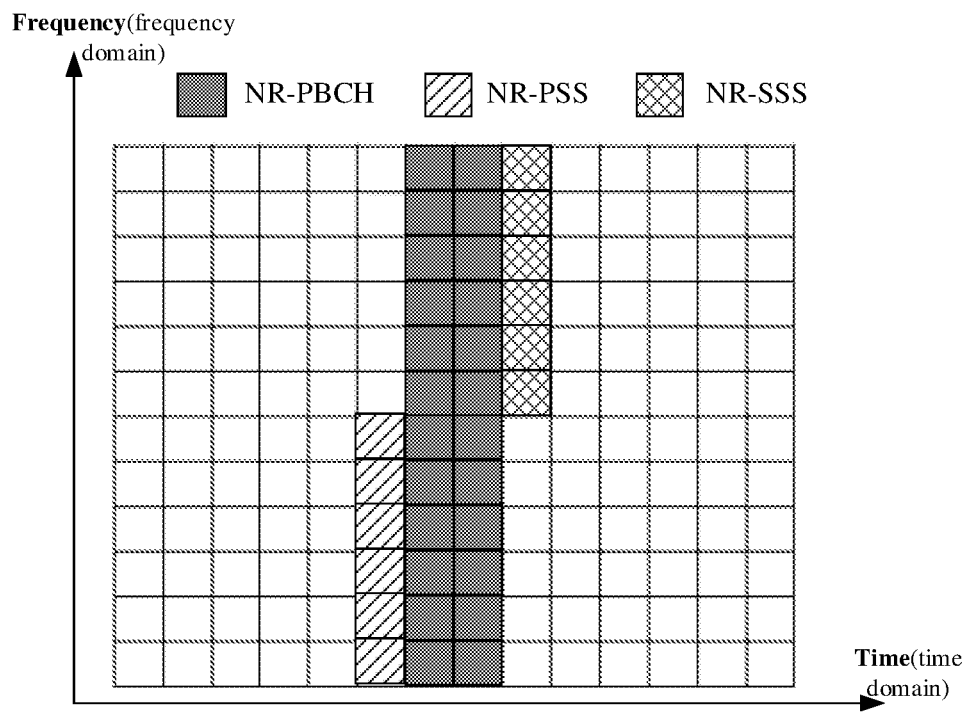
Figure 5C:
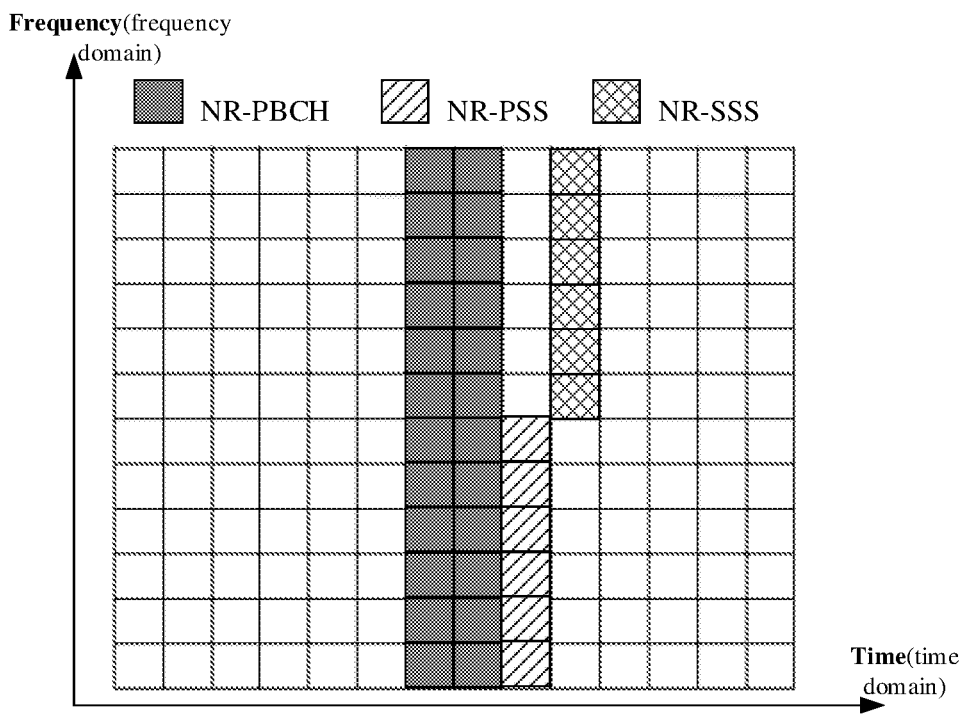
Figure 5D:
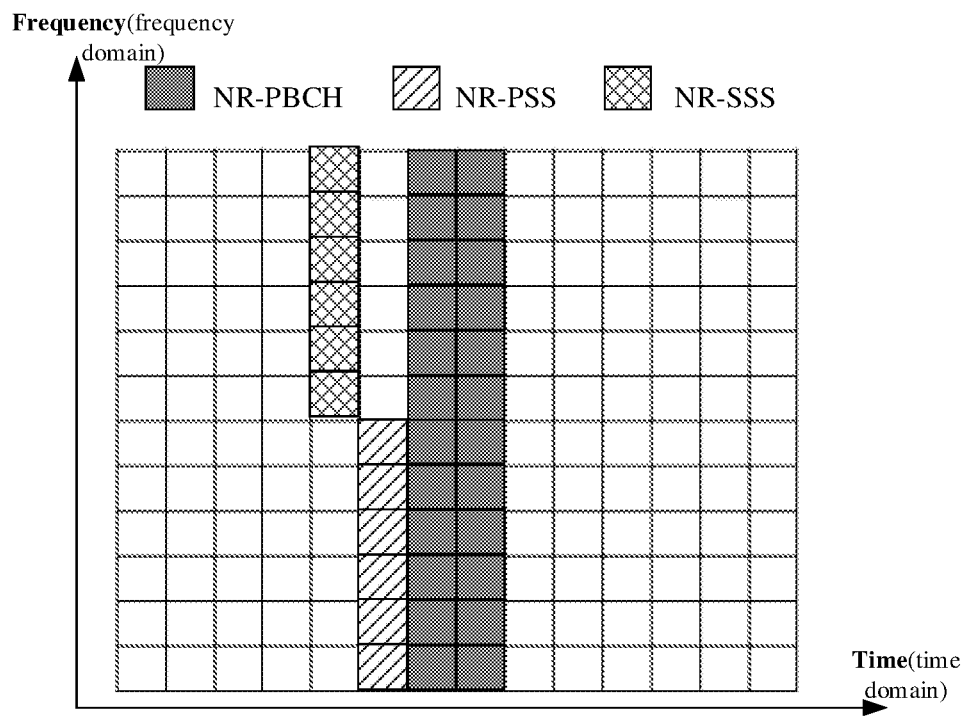
Figure 5E:
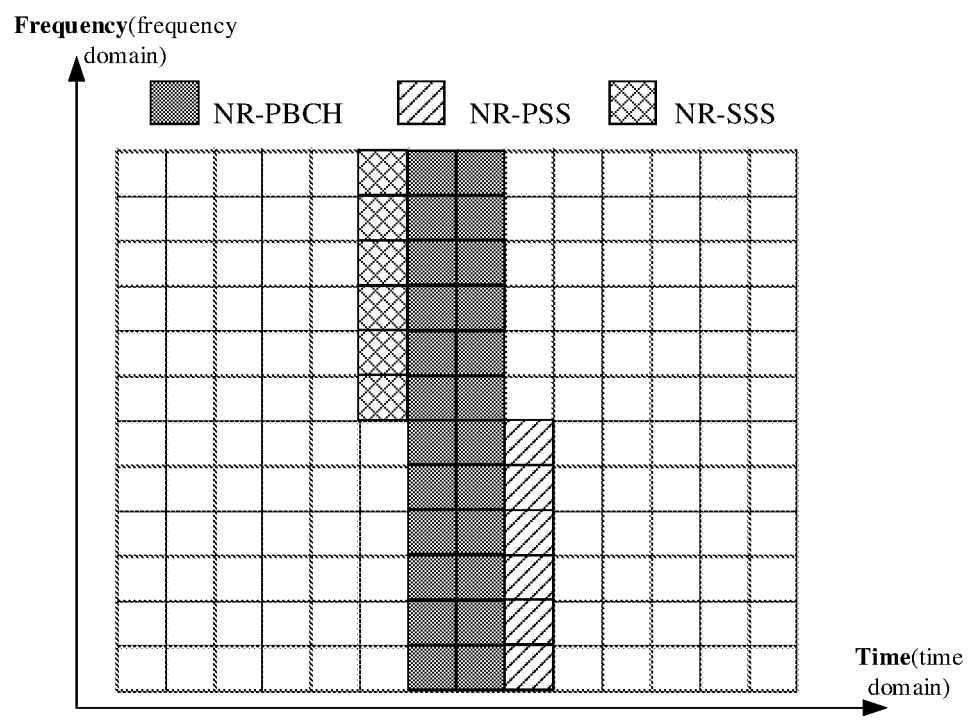
Figure 5F:
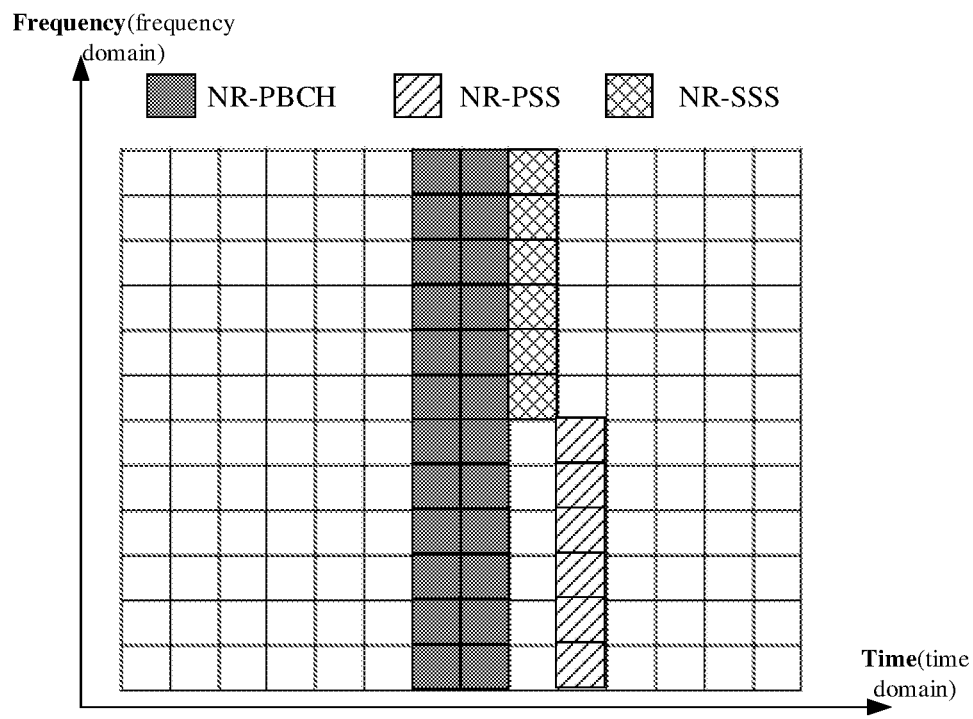
Figure 5G:
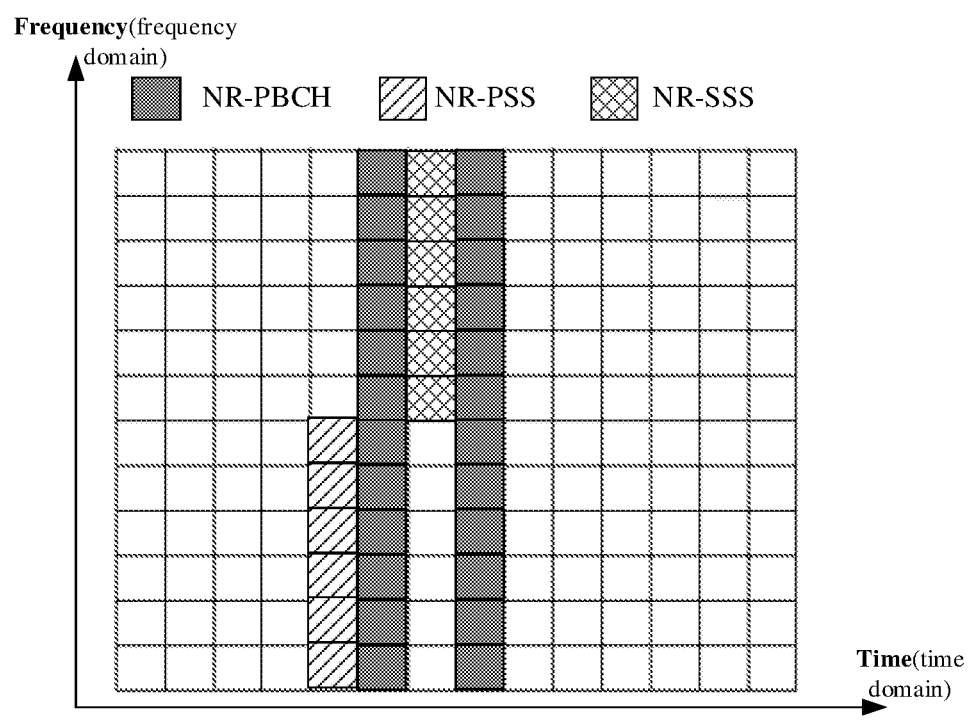
Figure 5H:
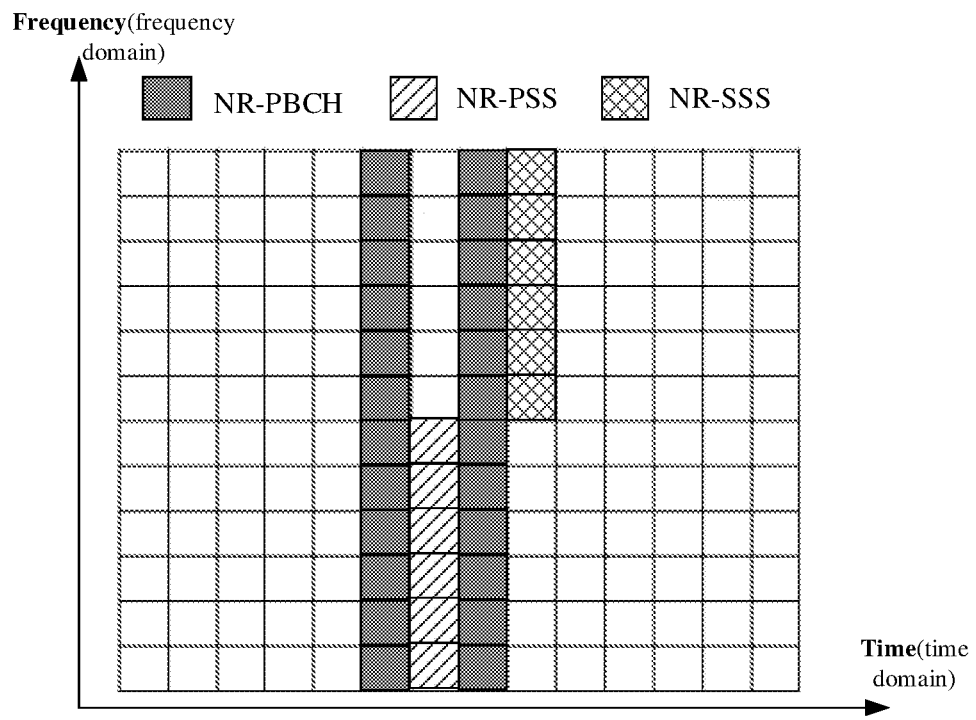
Figure 5I:
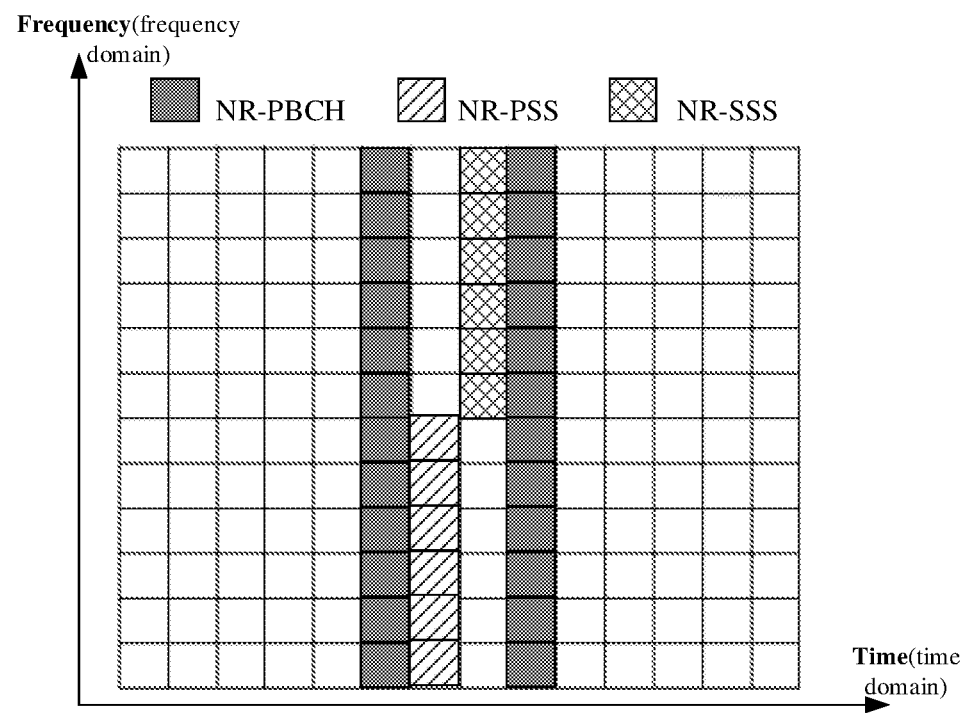
Figure 5J:
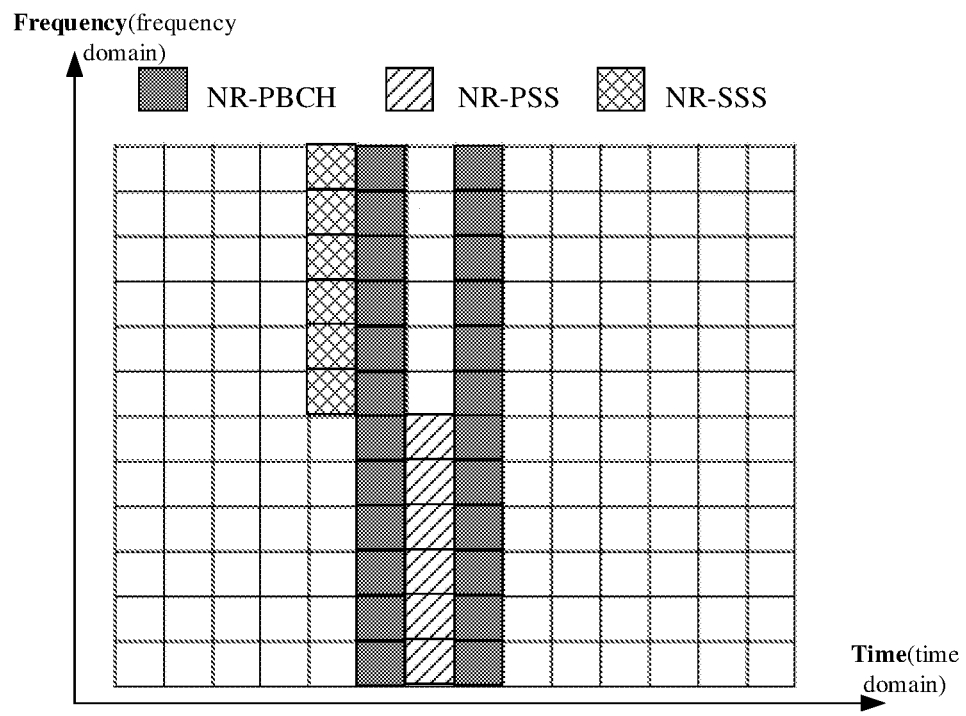
Figure 5K:
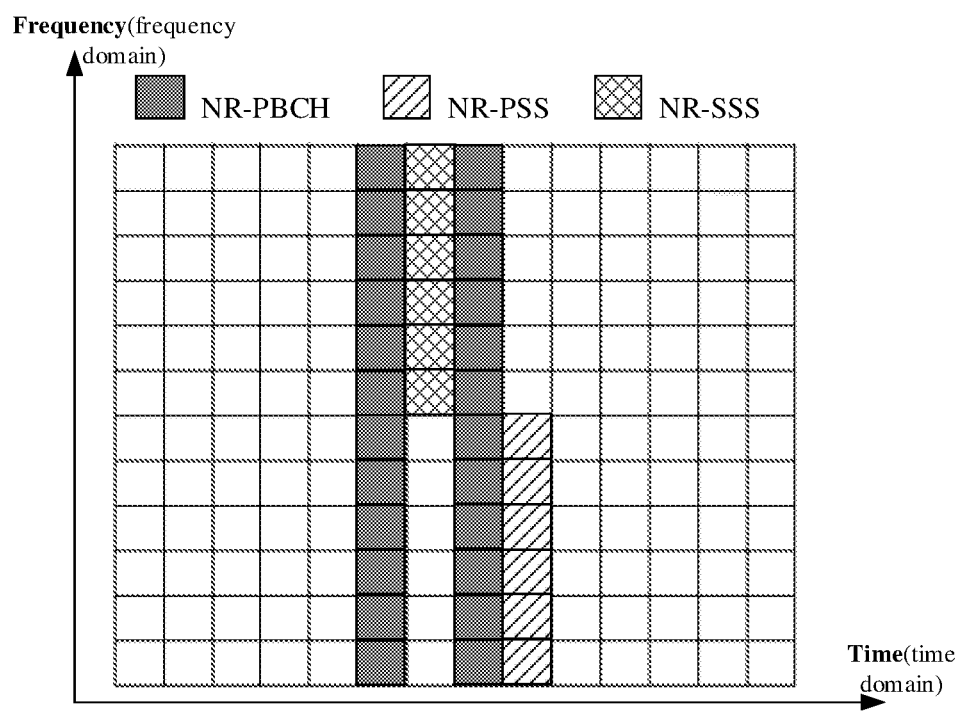
Figure 5L:
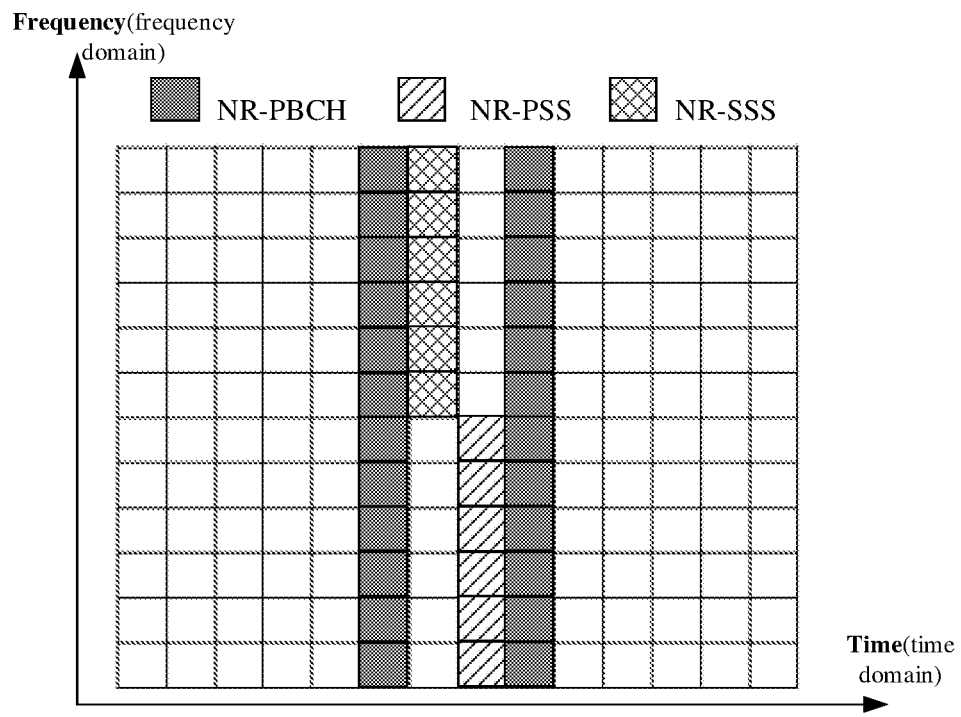

Specifically, it is assumed that the first frequency domain resource is aligned with the third frequency domain resource at a low frequency, and the second frequency domain resource is aligned with the third frequency domain resource at a high frequency. As shown in FIG. 5a to FIG. 5f, the third time domain resource for the NR-PBCH signal is consecutive time domain symbols. That is, the NR-PBCH signal is mapped to two consecutive time domain symbols. Further, as shown in FIG. 5a to FIG. 5c, the first time domain resource for transmitting the NR-PSS is located before the second time domain resource for transmitting the NR-SSS. That is, for the same SS block, the time domain symbols to which the NR-PBCH signal is mapped are consecutive, and the time domain symbol to which the NR-PSS is mapped is located before the time domain symbol to which the NR-SSS is mapped. As shown in FIG. 5d to FIG. 5f, the second time domain resource for transmitting the NR-SSS is located before the first time domain resource for transmitting the NR-PSS. That is, for the same SS block, the time domain symbols to which the NR-PBCH signal is mapped are consecutive, and the time domain symbol to which the NR-PSS is mapped is located after the time domain symbol to which the NR-SSS is mapped. Specifically, as shown in FIG. 5g to FIG. 5l, the third time domain resource for transmitting the NR-PBCH signal is non-consecutive time domain symbols. That is, the NR-PBCH signal is mapped to two non-consecutive time domain symbols. Further, as shown in FIG. 5g to FIG. 5i, the first time domain resource for transmitting the NR-PSS is located before the second time domain resource for transmitting the NR-SSS. That is, for the same SS block, the time domain symbols to which the NR-PBCH signal is mapped are not consecutive, and the time domain symbol to which the NR-PSS is mapped is located before the time domain symbol to which the NR-SSS is mapped. As shown in FIG. 5j to FIG. 5l, the second time domain resource for transmitting the NR-SSS is located before the first time domain resource for transmitting the NR-PSS. That is, for the same SS block, the time domain symbols to which the NR-PBCH signal is mapped are not consecutive, and the time domain symbol to which the NR-PSS is mapped is located after the time domain symbol to which the NR-SSS is mapped.

Figure 6A:
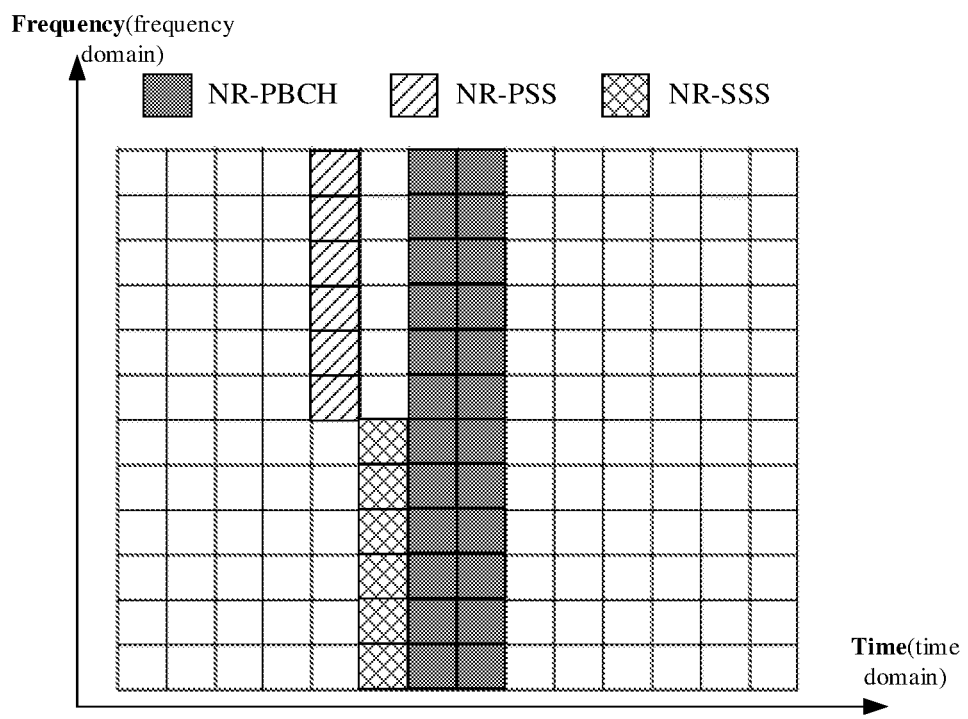
FIG. 6a to FIG. 6l are a second group of schematic diagrams of resource mapping of SS blocks in the scenario 4 according to embodiments of the present disclosure.
Figure 6B:
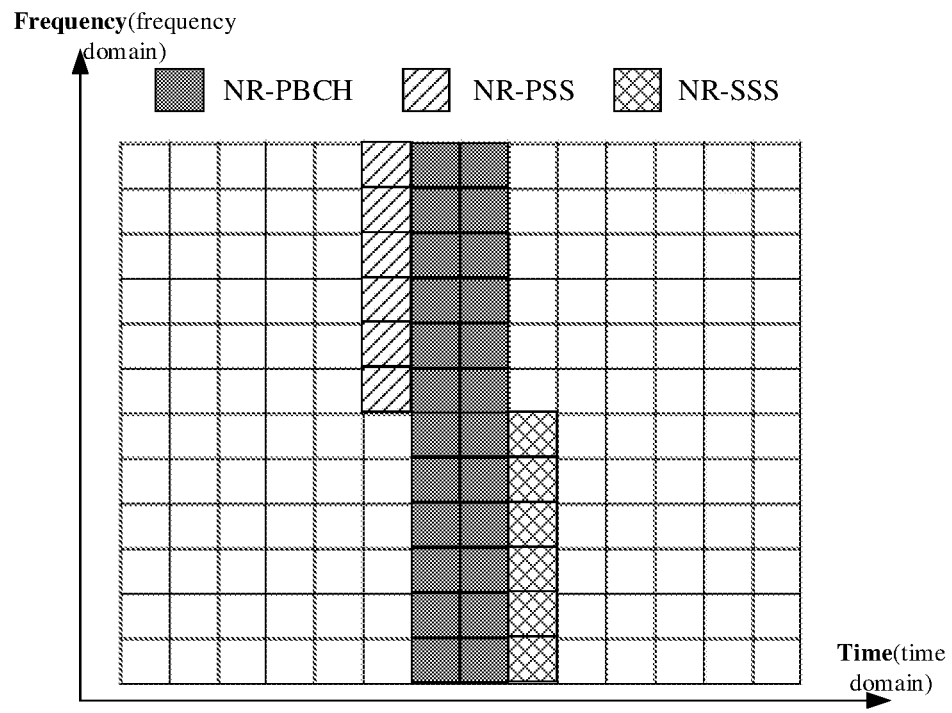
Figure 6C:
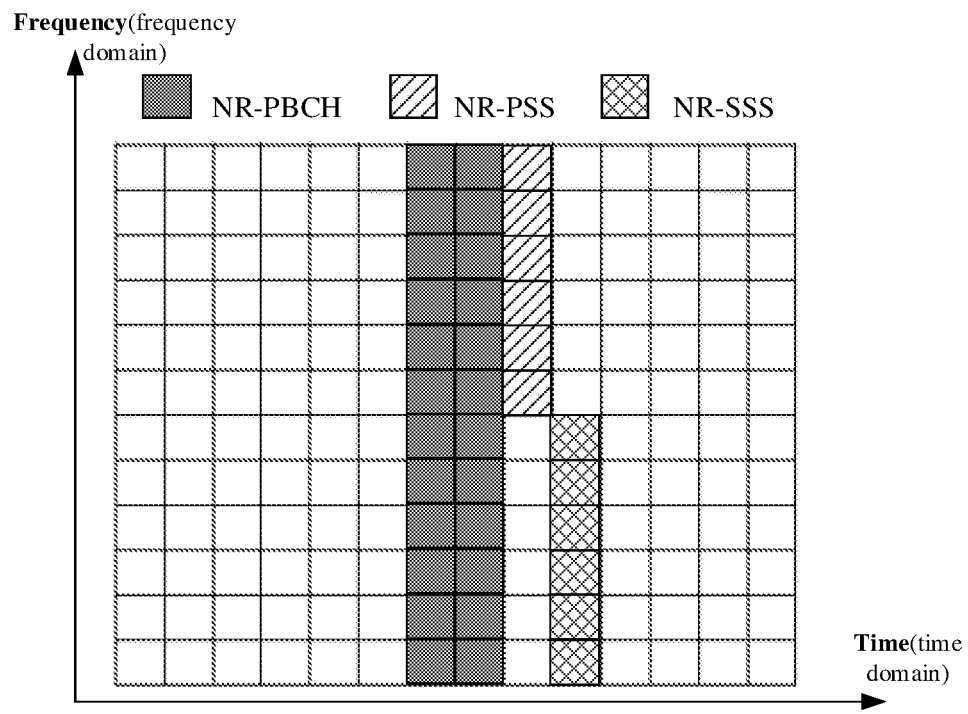
Figure 6D:
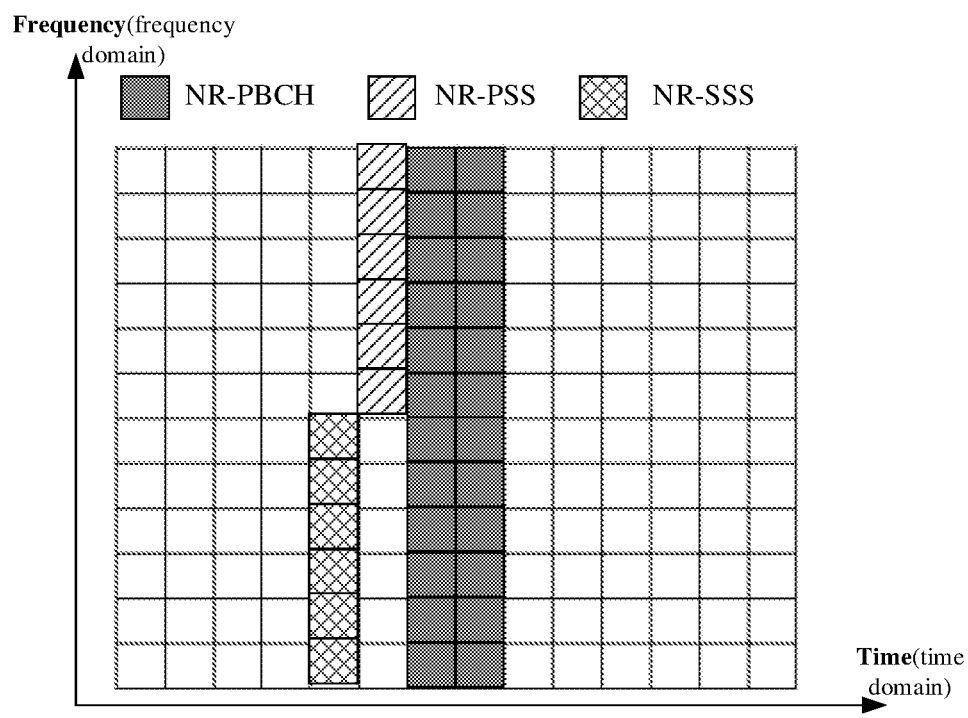
Figure 6E:
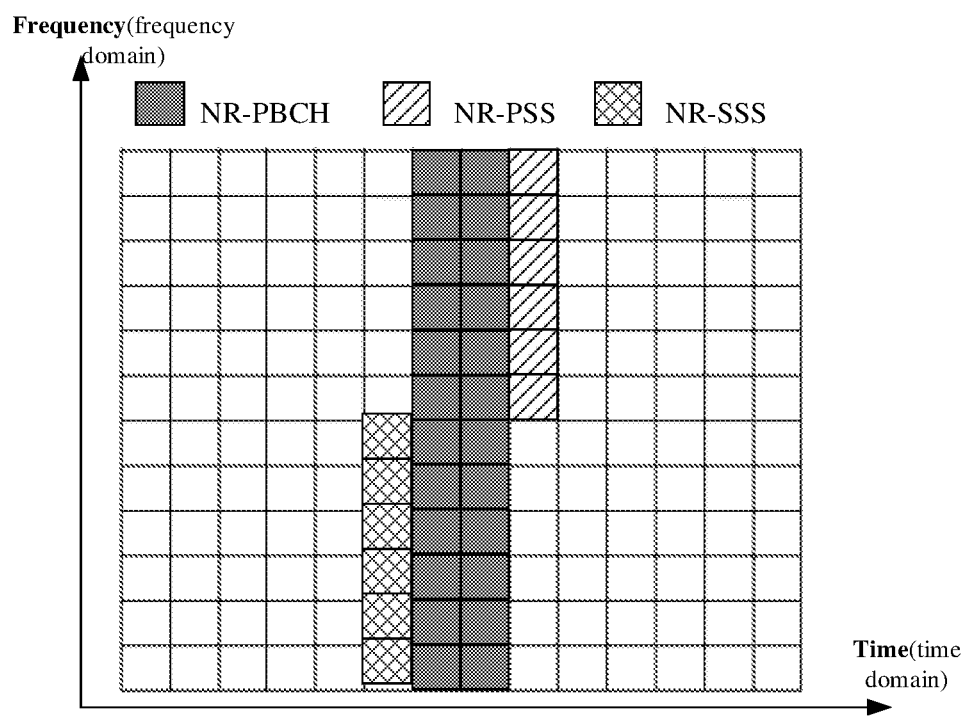
Figure 6F:
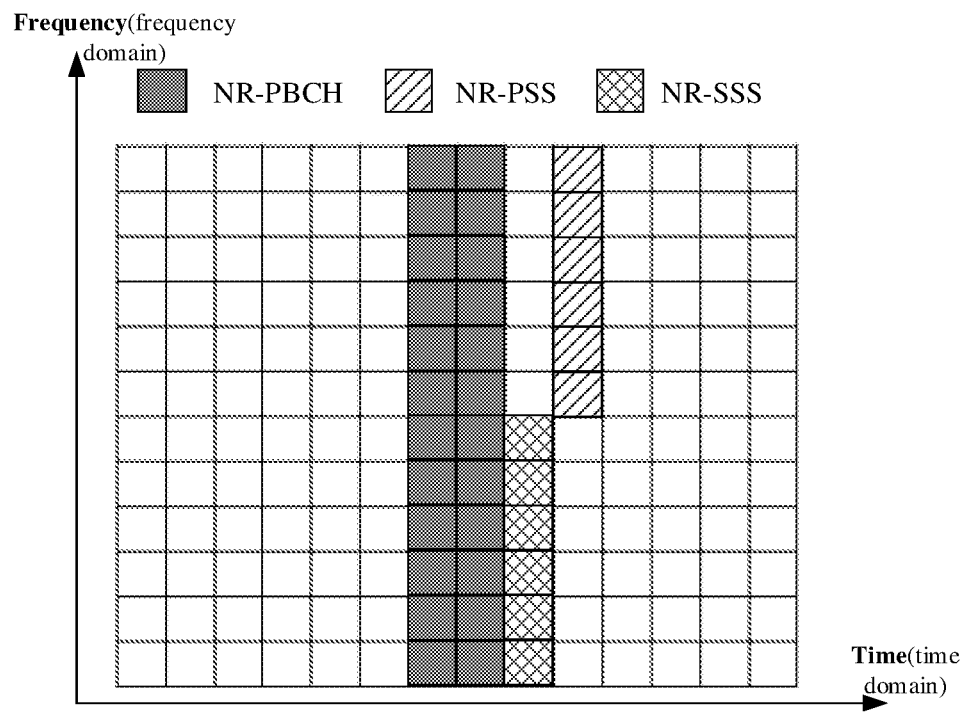
Figure 6G:
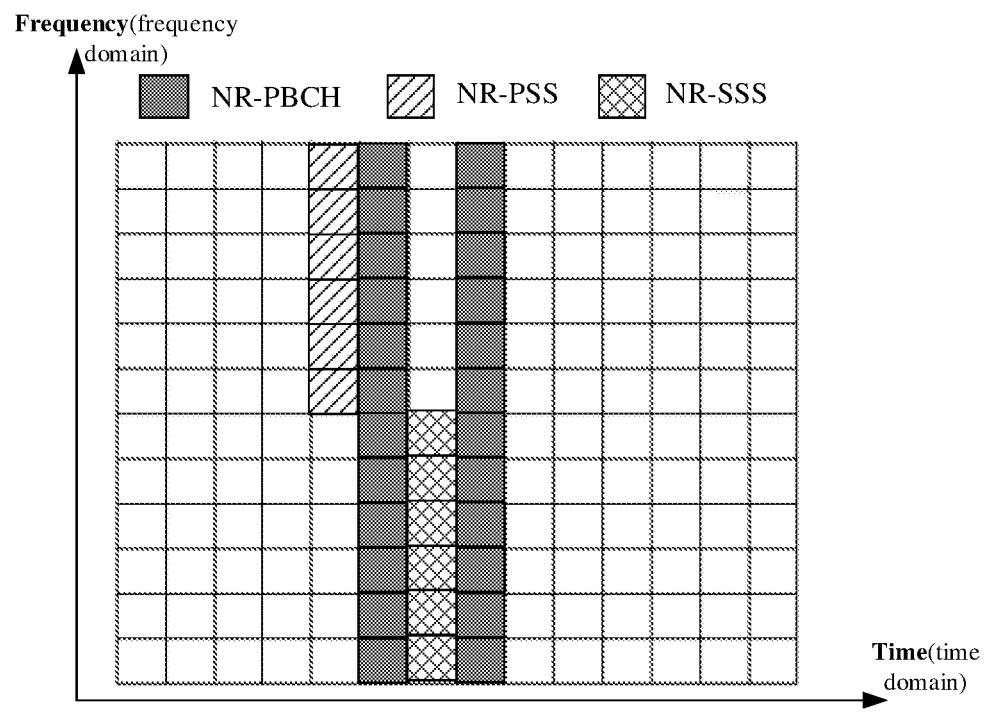
Figure 6H:
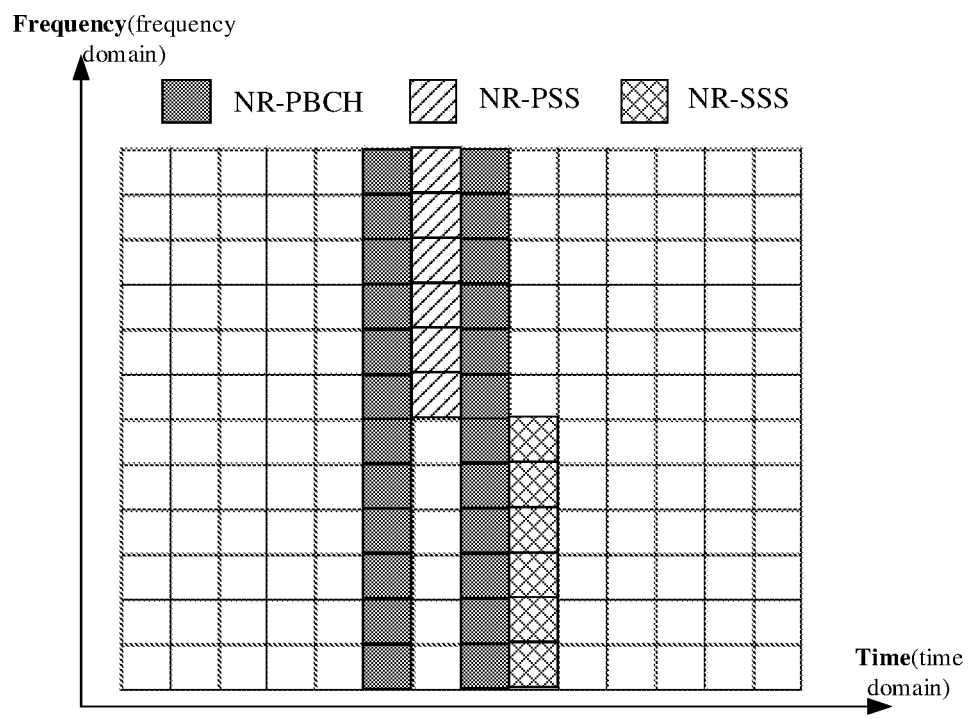
Figure 6I:
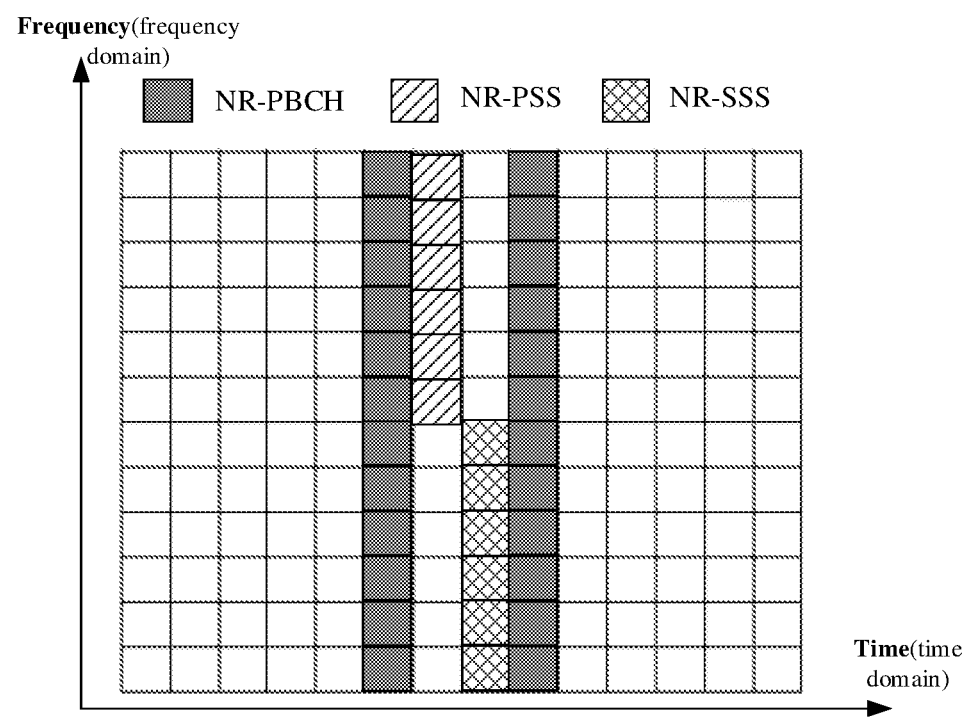
Figure 6J:
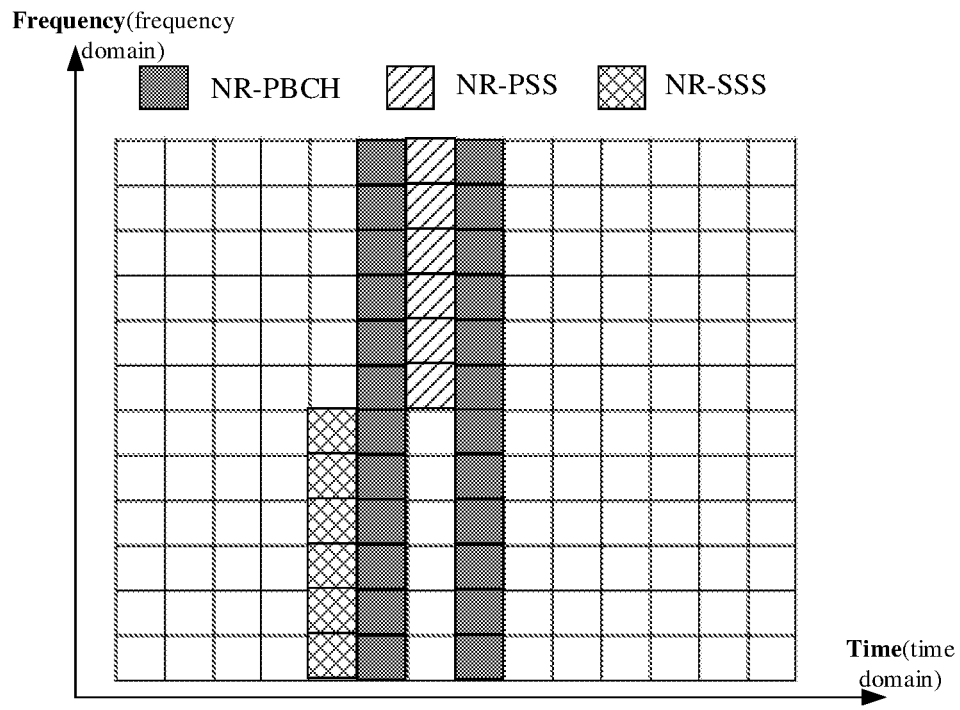
Figure 6K:
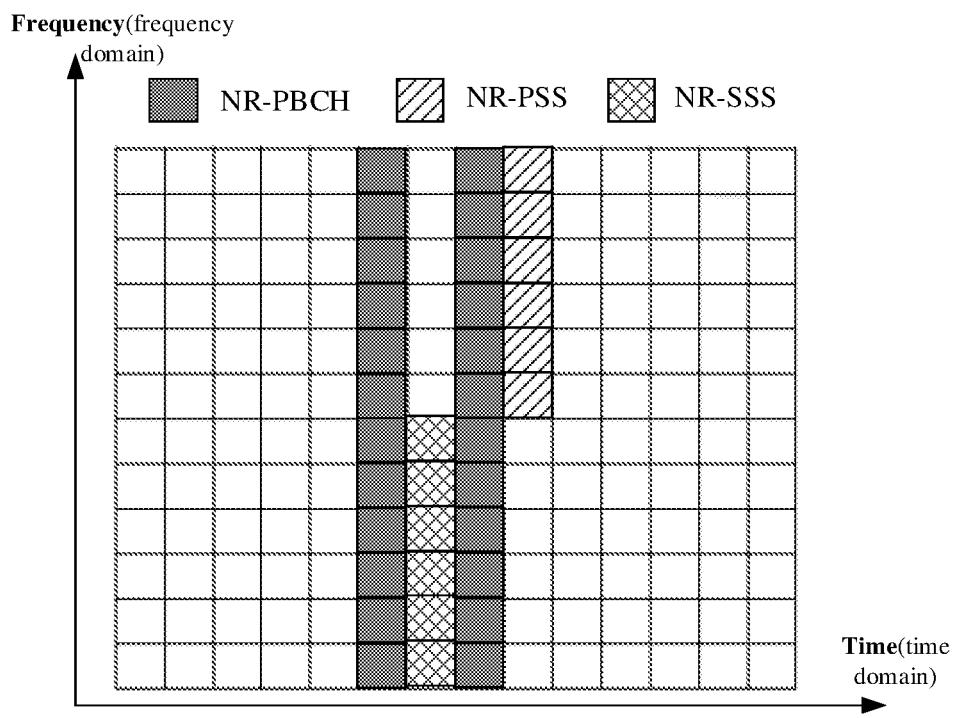
Figure 6L:
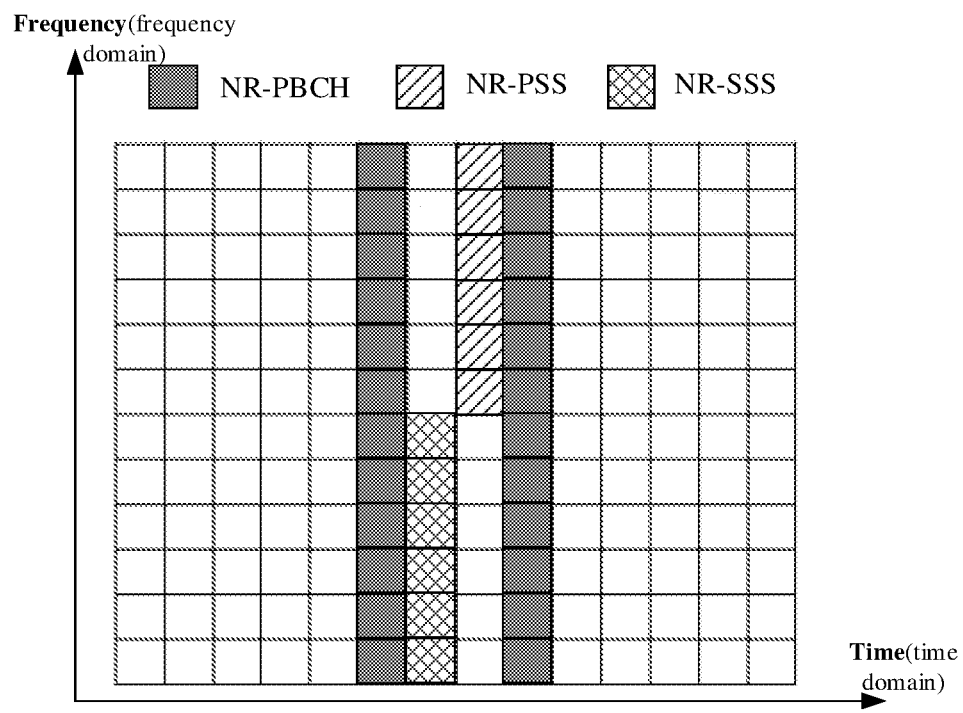

Specifically, it is assumed that the first frequency domain resource is aligned with the third frequency domain resource at a high frequency, and the second frequency domain resource is aligned with the third frequency domain resource at a low frequency. As shown in FIG. 6a to FIG. 6f, the third time domain resource for the NR-PBCH channel signal is consecutive time domain symbols. That is, the NR-PBCH signal is mapped to two consecutive time domain symbols. Further, as shown in FIG. 6a to FIG. 6c, the first time domain resource for transmitting the NR-PSS is located before the second time domain resource for transmitting the NR-SSS. That is, for the same SS block, the time domain symbols to which the NR-PBCH signal is mapped are consecutive, and the time domain symbol to which the NR-PSS is mapped is located before the time domain symbol to which the NR-SSS is mapped. As shown in FIG. 6d to FIG. 6f, the second time domain resource for transmitting the NR-SSS is located before the first time domain resource for transmitting the NR-PSS. That is, for the same SS block, the time domain symbols to which the NR-PBCH signal is mapped are consecutive, and the time domain symbol to which the NR-PSS is mapped is located after the time domain symbol to which the NR-SSS is mapped. Specifically, as shown in FIG. 6g to FIG. 6l, the third time domain resource for transmitting the NR-PBCH signal is non-consecutive time domain symbols. That is, the NR-PBCH signal is mapped to two non-consecutive time domain symbols. Further, as shown in FIG. 6g to FIG. 6i, the first time domain resource for transmitting the NR-PSS is located before the second time domain resource for transmitting the NR-SSS. That is, for the same SS block, the time domain symbols to which the NR-PBCH signal is mapped are not consecutive, and the time domain symbol to which the NR-PSS is mapped is located before the time domain symbol to which the NR-SSS is mapped. As shown in FIG. 6j to FIG. 6l, the second time domain resource for transmitting the NR-SSS is located before the first time domain resource for transmitting the NR-PSS. That is, for the same SS block, the time domain symbols to which the NR-PBCH signal is mapped are not consecutive, and the time domain symbol to which the NR-PSS is mapped is located after the time domain symbol to which the NR-SSS is mapped.

In the embodiments of the present disclosure, a position relationship among a first frequency domain resource, a second frequency domain resource, and a third frequency domain resource satisfies a preset condition, an NR-PSS is transmitted by using the first frequency domain resource, an NR-SSS is transmitted by using the second frequency domain resource, and an NR-PBCH signal is transmitted by using the third frequency domain resource. An SS block transmission is enabled in an NR system by using the foregoing frequency domain resource mapping relationship, making it convenient for user equipment to receive the SS block.

The method of transmitting an SS block is described in detail with respect to different scenarios in the foregoing embodiments respectively. Network equipment corresponding to the method is further described with reference to the accompanying drawings in the following embodiments.

Figure 7:
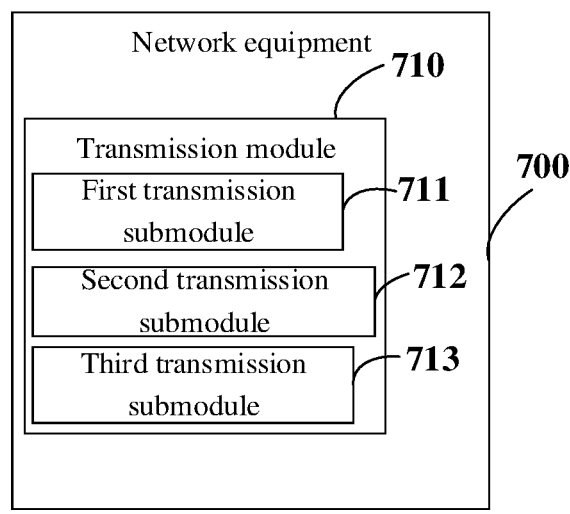
FIG. 7 is a schematic modular diagram of network equipment according to an embodiment of the present disclosure.

As shown in FIG. 7, network equipment 700 in an embodiment of the present disclosure can implement the details of the method of the foregoing embodiments in which an NR-PSS is transmitted by using a first frequency domain resource, an NR-SSS is transmitted by using a second frequency domain resource, and an NR-PBCH signal is transmitted by using a third frequency domain resource, where position relationship among the first frequency domain resource, the second frequency domain resource, and the third frequency domain resource satisfies a preset condition, and achieve the same effects. An SS block includes the NR-PSS, the NR-SSS, and the NR-PBCH signal. The network equipment 700 specifically includes the following functional module: a transmission module 710, configured to: transmit an NR-PSS in an SS block by using a first frequency domain resource, transmit an NR-SSS in the SS block by using a second frequency domain resource, and transmit an NR-PBCH signal in the SS block by using the third frequency domain resource. A position relationship among the first frequency domain resource, the second frequency domain resource, and the third frequency domain resource satisfies a preset condition.

Optionally, that a position relationship among the first frequency domain resource, the second frequency domain resource, and the third frequency domain resource satisfies a preset condition includes: a center frequency of the first frequency domain resource, a center frequency of the second frequency domain resource, and a center frequency of the third frequency domain resource are aligned.

Optionally, that a position relationship among the first frequency domain resource, the second frequency domain resource, and the third frequency domain resource satisfies a preset condition includes: the first frequency domain resource, the second frequency domain resource, and the third frequency domain resource are aligned at a high frequency.

Optionally, that a position relationship among the first frequency domain resource, the second frequency domain resource, and the third frequency domain resource satisfies a preset condition includes: the first frequency domain resource, the second frequency domain resource, and the third frequency domain resource are aligned at a low frequency.

Optionally, that a position relationship among the first frequency domain resource, the second frequency domain resource, and the third frequency domain resource satisfies a preset condition includes: the first frequency domain resource is aligned with the third frequency domain resource at a low frequency, and the second frequency domain resource is aligned with the third frequency domain resource at a high frequency; or, the second frequency domain resource is aligned with the third frequency domain resource at a low frequency, and the first frequency domain resource is aligned with the third frequency domain resource at a high frequency.

Optionally, the transmission module 710 includes: a first transmission submodule 711, configured to transmit the NR-PSS on a first time domain resource by using the first frequency domain resource; a second transmission submodule 712, configured to transmit the NR-SSS on a second time domain resource by using the second frequency domain resource; and a third transmission submodule 713, configured to transmit the NR-PBCH signal on a third time domain resource by using the third frequency domain resource.

Optionally, the third time domain resource may be consecutive time domain symbols or may be non-consecutive time domain symbols.

In an implementation of the present disclosure, the first time domain resource is located before the second time domain resource. In another implementation of the present disclosure, the second time domain resource is located before the first time domain resource.

It should be noted that, in the embodiments of the present disclosure, a position relationship among a first frequency domain resource, a second frequency domain resource, and a third frequency domain resource satisfies a preset condition, an NR-PSS is transmitted by using the first frequency domain resource, an NR-SSS is transmitted by using the second frequency domain resource, and an NR-PBCH signal is transmitted by using the third frequency domain resource. An SS block transmission is enabled in an NR system by using the foregoing frequency domain resource mapping relationship, making it convenient for user equipment to receive the SS block.

Figure 8:
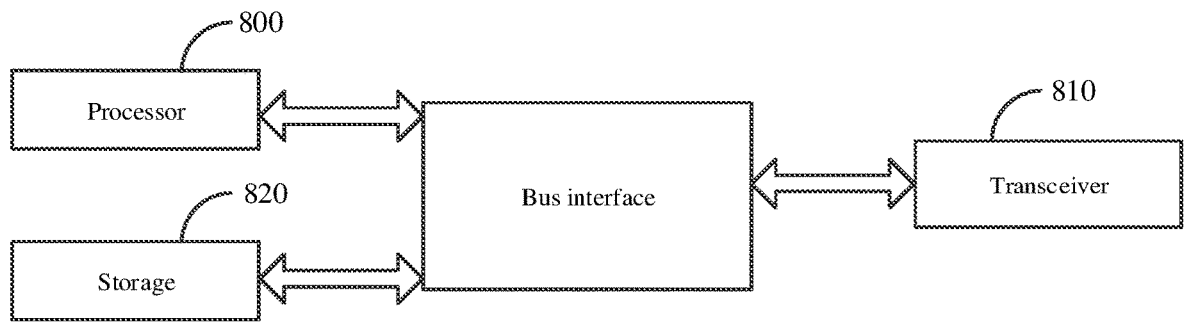
FIG. 8 is a block diagram of network equipment according to an embodiment of the present disclosure.

To better achieve the foregoing objective, as shown in FIG. 8, an embodiment of the present disclosure further provides network equipment. The network equipment includes: a processor 800, a storage 820 connected to the processor 800 through a bus interface, and a transceiver 810 connected to the processor 800 through the bus interface. The storage 820 is configured to store a program and data used by the processor while in operation. The transceiver 810 is configured to transmit data information or a pilot. The transceiver 810 is further configured to receive an uplink control channel. When the processor 800 calls and executes the program and data stored in the storage 820, specifically, the processor 800 is configured to read and execute the program in the storage 820.

The transceiver 810 is configured to receive and transmit data under the control of the processor 800, and is specifically configured to perform the following functions: transmitting an NR-PSS by using a first frequency domain resource, transmitting an NR-SSS by using a second frequency domain resource, transmitting an NR-PBCH signal by using a third frequency domain resource. A position relationship among the first frequency domain resource, the second frequency domain resource, and the third frequency domain resource satisfies a preset condition. An SS block includes the NR-PSS, the NR-SSS, and the NR-PBCH signal.

In FIG. 8, a bus architecture may include any number of interconnected buses and bridges. Various circuits, specifically, one or more processors represented by the processor 800 and a storage represented by the storage 820, are linked together. The bus architecture may also link various other circuits such as peripherals, voltage regulators and power management circuits, which are well known in the art, and therefore a further description is omitted herein. The bus interface provides interfaces. The transceiver 810 may be a plurality of elements, that is, includes a transmitter and a transceiver, to provide units configured to communicate with various other apparatuses over a transmission medium. The processor 800 is responsible for managing the bus architecture and general processing, and the storage 820 may store data used by the processor 800 while in operation.

Optionally, that a position relationship among the first frequency domain resource, the second frequency domain resource, and the third frequency domain resource satisfies a preset condition includes: a center frequency of the first frequency domain resource, a center frequency of the second frequency domain resource, and a center frequency of the third frequency domain resource are aligned.

Optionally, that a position relationship among the first frequency domain resource, the second frequency domain resource, and the third frequency domain resource satisfies a preset condition includes: the first frequency domain resource, the second frequency domain resource, and the third frequency domain resource are aligned at a high frequency.

Optionally, that a position relationship among the first frequency domain resource, the second frequency domain resource, and the third frequency domain resource satisfies a preset condition includes: the first frequency domain resource, the second frequency domain resource, and the third frequency domain resource are aligned at a low frequency.

Optionally, that a position relationship among the first frequency domain resource, the second frequency domain resource, and the third frequency domain resource satisfies a preset condition includes: the first frequency domain resource is aligned with the third frequency domain resource at a low frequency, the second frequency domain resource is aligned with the third frequency domain resource at a high frequency; or, the second frequency domain resource is aligned with the third frequency domain resource at a low frequency, the first frequency domain resource is aligned with the third frequency domain resource at a high frequency.

Specifically, the processor 800 is further configured to control the transceiver 810 to: transmit the NR-PSS on a first time domain resource by using the first frequency domain resource; transmit the NR-SSS on a second time domain resource by using the second frequency domain resource; transmit the NR-PBCH signal on a third time domain resource by using the third frequency domain resource.

Optionally, the third time domain resource may be consecutive time domain symbols or may be non-consecutive time domain symbols.

In an implementation of the present disclosure, the first time domain resource is located before the second time domain resource. In another implementation of the present disclosure, the second time domain resource is located before the first time domain resource.

As such, a position relationship among a first frequency domain resource, a second frequency domain resource, and a third frequency domain resource satisfies a preset condition, an NR-PSS is transmitted by using the first frequency domain resource, an NR-SSS is transmitted by using the second frequency domain resource, an NR-PBCH signal is transmitted by using the third frequency domain resource. An SS block transmission is enabled in an NR system by using the foregoing frequency domain resource mapping relationship, making it convenient for user equipment to receive the SS block.

The method of transmitting an SS block and the network equipment of the present disclosure are described from the perspective of a network equipment side in the foregoing embodiments. In the following embodiments, a method of transmitting an SS block on a user equipment side is further described with reference to the accompanying drawings.

Figure 9:
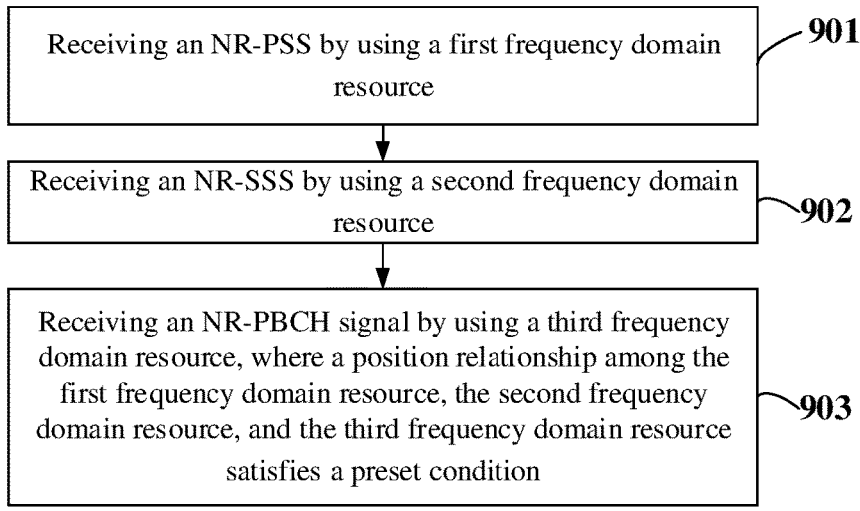
FIG. 9 is a flow diagram of a method of transmitting an SS block on a user equipment side according to an embodiment of the present disclosure.

As shown in FIG. 9, a method of transmitting an SS block in an embodiment of the present disclosure is applied to a user equipment side. Specifically, the method includes the following steps.

Step 901: Receiving an NR-PSS by using a first frequency domain resource.

Step 902: Receiving an NR-SSS by using a second frequency domain resource.

Step 903: Receiving an NR-PBCH signal by using a third frequency domain resource. A position relationship among the first frequency domain resource, the second frequency domain resource, and the third frequency domain resource satisfies a preset condition.

It should be noted that, the foregoing step 901 to step 903 are only one reception time sequence of the NR-PSS, the NR-SSS, and the NR-PBCH signal in the present disclosure. In other embodiments of the present disclosure, another reception time sequence may be used to receive the NR-PSS, the NR-SSS, and the NR-PBCH signal.

An SS block includes the NR-PSS, the NR-SSS, and the NR-PBCH signal. The user equipment receives frame synchronization information and cell ID information from network equipment by using the NR-PSS and the NR-SSS, and receives, by using the NR-PBCH signal, limited system information required to communicate with a cell and operate normally. The bandwidth of the first frequency domain resource and/or the bandwidth of the second frequency domain resource are/is different from the bandwidth of the third frequency domain resource. The position relationship among the first frequency domain resource, the second frequency domain resource, and the third frequency domain resource satisfies the preset condition.

Figure 10:
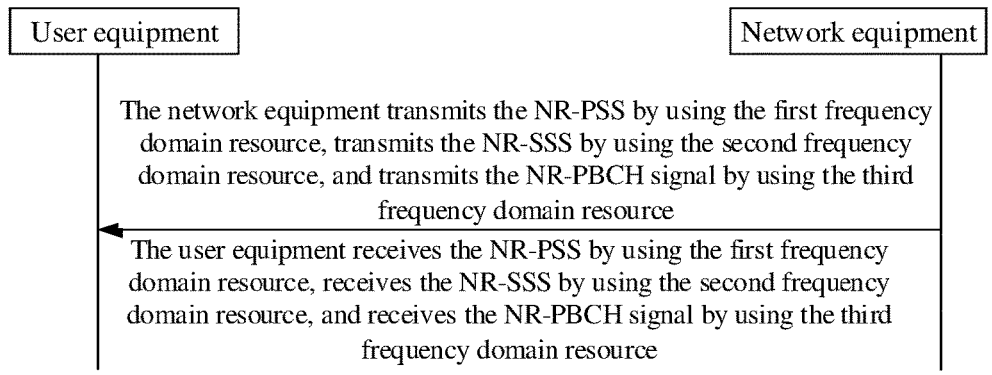
FIG. 10 is a flow diagram of the interaction between network equipment and user equipment according to an embodiment of the present disclosure.

From the perspective of a system constituted by the network equipment and the user equipment, as shown in FIG. 10, the network equipment transmits the NR-PSS by using the first frequency domain resource, transmits the NR-SSS by using the second frequency domain resource, and transmits the NR-PBCH signal by using the third frequency domain resource. The user equipment receives the NR-PSS by using the first frequency domain resource, receives the NR-SSS by using the second frequency domain resource, and receives the NR-PBCH signal by using the third frequency domain resource.

Optionally, according to the present disclosure, a transmission resource for transmitting the SS block may further be mapped to a time domain resource. Specifically, the NR-PSS is received on a first time domain resource by using the first frequency domain resource; the NR-SSS is received on a second time domain resource by using the second frequency domain resource; the NR-PBCH signal is received on a third time domain resource by using the third frequency domain resource.

The position relationship among the first frequency domain resource, the second frequency domain resource, and the third frequency domain resource and the position relationship among the first time domain resource, the second time domain resource, and the third time domain resource are further described below with reference to specific application scenarios and the accompanying drawings.

For the foregoing scenario 1, the preset condition to be satisfied by the frequency domain resources is: a center frequency of the first frequency domain resource, a center frequency of the second frequency domain resource, and a center frequency of the third frequency domain resource are aligned. In the scenario, the third time domain resource for transmitting the NR-PBCH signal is consecutive time domain symbols, or, the third time domain resource for transmitting the NR-PBCH signal is non-consecutive time domain symbols. The first time domain resource for transmitting the NR-PSS is located before the second time domain resource for transmitting the NR-SSS, or, the second time domain resource for transmitting the NR-SSS is located before the first time domain resource for transmitting the NR-PSS. Any one of all combinations of the position relationships of the time domain resources may satisfy the requirement of the transmission of an SS block in an NR system.

For the foregoing scenario 2, the preset condition to be satisfied by the frequency domain resources is: the first frequency domain resource, the second frequency domain resource, and the third frequency domain resource are aligned at a high frequency. In the scenario, the third time domain resource for transmitting the NR-PBCH signal is consecutive time domain symbols, or, the third time domain resource for transmitting the NR-PBCH signal is non-consecutive time domain symbols. The first time domain resource for transmitting the NR-PSS is located before the second time domain resource for transmitting the NR-SSS, or, the second time domain resource for transmitting the NR-SSS is located before the first time domain resource for transmitting the NR-PSS. Any one of all combinations of the position relationships of the time domain resources may satisfy the requirement of the transmission of an SS block in an NR system.

For the foregoing scenario 3, the preset condition to be satisfied by the frequency domain resources is: the first frequency domain resource, the second frequency domain resource, and the third frequency domain resource are aligned at a low frequency. In the scenario, the third time domain resource for transmitting the NR-PBCH signal is consecutive time domain symbols, or, the third time domain resource for transmitting the NR-PBCH signal is non-consecutive time domain symbols. The first time domain resource for transmitting the NR-PSS is located before the second time domain resource for transmitting the NR-SSS, or, the second time domain resource for transmitting the NR-SSS is located before the first time domain resource for transmitting the NR-PSS. Any one of all combinations of the position relationships of the time domain resources may satisfy the requirement of the transmission of an SS block in an NR system.

For the foregoing scenario 4, the preset condition to be satisfied by the frequency domain resources is: one of the first frequency domain resource and the second frequency domain resource is aligned with the third frequency domain resource at a low frequency, and the other of the first frequency domain resource and the second frequency domain resource is aligned with the third frequency domain resource at a high frequency. That is, the first frequency domain resource is aligned with the third frequency domain resource at a low frequency, and the second frequency domain resource is aligned with the third frequency domain resource at a high frequency; or, the second frequency domain resource is aligned with the third frequency domain resource at a low frequency, and the first frequency domain resource is aligned with the third frequency domain resource at a high frequency. In the two scenarios, the third time domain resource for transmitting the NR-PBCH signal is consecutive time domain symbols, or, the third time domain resource for transmitting the NR-PBCH signal is non-consecutive time domain symbols. The first time domain resource for transmitting the NR-PSS is located before the second time domain resource for transmitting the NR-SSS, or, the second time domain resource for transmitting the NR-SSS is located before the first time domain resource for transmitting the NR-PSS. Any one of all combinations of the position relationships of the time domain resources may satisfy the requirement of the transmission of an SS block in an NR system.

In the embodiments of the present disclosure, a position relationship among a first frequency domain resource, a second frequency domain resource, and a third frequency domain resource satisfies a preset condition and a position relationship among a first time domain resource, a second time domain resource, and a third time domain resource also satisfy a preset condition. An NR-PSS is transmitted on the first time domain resource by using the first frequency domain resource, an NR-SSS is transmitted on the second time domain resource by using the second frequency domain resource, an NR-PBCH signal is transmitted on the third time domain resource by using the third frequency domain resource. An SS block transmission is enabled in an NR system by using the foregoing frequency domain resource mapping relationship, making it convenient for user equipment to receive the SS block.

The method of transmitting an SS block in different scenarios is described in the foregoing embodiment. The user equipment corresponding to the method is further described below with reference to the accompanying drawings.

Figure 11:
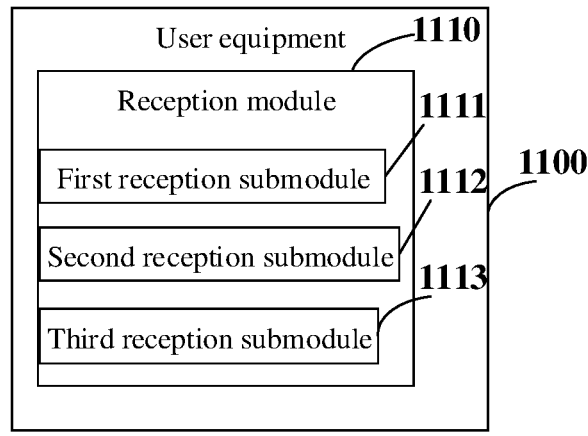
FIG. 11 is a schematic modular diagram of user equipment according to an embodiment of the present disclosure.

As shown in FIG. 11, user equipment 1100 in an embodiment of the present disclosure may implement the details of the method of the foregoing embodiments in which an NR-PSS is received by using a first frequency domain resource, an NR-SSS is received by using a second frequency domain resource, an NR-PBCH signal is received by using a third frequency domain resource, and achieve the same effects. The SS block includes the NR-PSS, the NR-SSS, and the NR-PBCH signal, and a position relationship among the first frequency domain resource, the second frequency domain resource, and the third frequency domain resource satisfies a preset condition. The user equipment 1100 specifically includes the following functional module: a reception module 1110, configured to: receive an NR-PSS in an SS block by using a first frequency domain resource, receive an NR-SSS in the SS block by using a second frequency domain resource, and receive an NR-PBCH signal in the SS block by using a third frequency domain resource. The position relationship among the first frequency domain resource, the second frequency domain resource, and the third frequency domain resource satisfies a preset condition.

Optionally, that a position relationship among the first frequency domain resource, the second frequency domain resource, and the third frequency domain resource satisfies a preset condition includes: a center frequency of the first frequency domain resource, a center frequency of the second frequency domain resource, and a center frequency of the third frequency domain resource are aligned.

Optionally, that a position relationship among the first frequency domain resource, the second frequency domain resource, and the third frequency domain resource satisfies a preset condition includes: the first frequency domain resource, the second frequency domain resource, and the third frequency domain resource are aligned at a high frequency.

Optionally, that a position relationship among the first frequency domain resource, the second frequency domain resource, and the third frequency domain resource satisfies a preset condition includes: the first frequency domain resource, the second frequency domain resource, and the third frequency domain resource are aligned at a low frequency.

Optionally, that a position relationship among the first frequency domain resource, the second frequency domain resource, and the third frequency domain resource satisfies a preset condition includes: the first frequency domain resource is aligned with the third frequency domain resource at a low frequency, the second frequency domain resource is aligned with the third frequency domain resource at a high frequency; or, the second frequency domain resource is aligned with the third frequency domain resource at a low frequency, the first frequency domain resource is aligned with the third frequency domain resource at a high frequency.

Optionally, the reception module 1110 includes: a first reception submodule 1111, configured to receive the NR-PSS on a first time domain resource by using the first frequency domain resource; a second reception submodule 1112, configured to receive the NR-SSS on a second time domain resource by using the second frequency domain resource; a third reception submodule 1113, configured to receive the NR-PBCH signal on a third time domain resource by using the third frequency domain resource.

Optionally, the third time domain resource may be consecutive time domain symbols or may be non-consecutive time domain symbols.

In an implementation of the present disclosure, the first time domain resource is located before the second time domain resource. In another implementation of the present disclosure, the second time domain resource is located before the first time domain resource.

It should be noted that, in the embodiments of the present disclosure, a position relationship among a first frequency domain resource, a second frequency domain resource, and a third frequency domain resource satisfies a preset condition, an NR-PSS is transmitted by using the first frequency domain resource, an NR-SSS is transmitted by using the second frequency domain resource, an NR-PBCH signal is transmitted by using the third frequency domain resource. An SS block transmission is enabled in an NR system by using the foregoing frequency domain resource mapping relationship, making it convenient for user equipment to receive the SS block.

Figure 12:
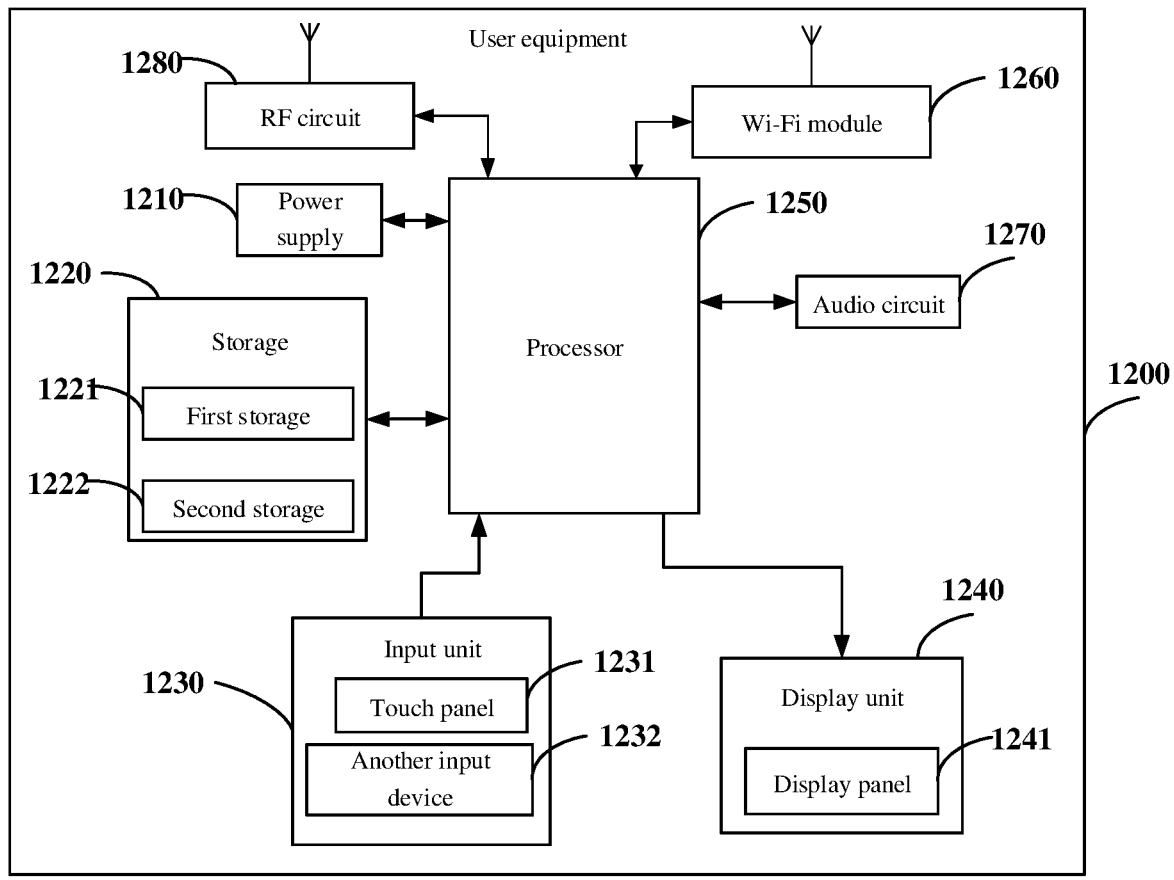
FIG. 12 is a block diagram of user equipment according to an embodiment of the present disclosure.

FIG. 12 is a schematic structural diagram of user equipment according to another embodiment of the present disclosure. Specifically, user equipment 1200 in FIG. 12 may be a mobile phone, a tablet computer, a personal digital assistant (PDA), a vehicle-mounted computer or the like.

The user equipment 1200 in FIG. 12 includes a power supply 1210, a storage 1220, an input unit 1230, a display unit 1240, a processor 1250, a Wireless Fidelity (Wi-Fi) module 1260, an audio circuit 1270, and a radio frequency (RF) circuit 1280.

The input unit 1230 may be configured to receive information input by a user and generate a signal input related to a user setting and function control of the user equipment 1200. Specifically, in this embodiment of the present disclosure, the input unit 1230 may include a touch panel 1231. The touch panel 1231, which may also be referred to as a touch screen, may collect a touch operation of a user on or near the touch panel 1231 (such as an operation performed by a user on the touch panel 1231 by using any suitable object or accessory, such as a finger or a stylus), and drive a corresponding connection apparatus according to a preset program. Optionally, the touch panel 1231 may include two parts, namely, a touch detection apparatus and a touch controller. The touch detection apparatus detects a position touched by the user, detects a signal generated by the touch operation, and transfers the signal to the touch controller. The touch controller receives touch information from the touch detection apparatus, converts the touch information into touch point coordinates, and transmits the touch point coordinates to the processor 1250. Moreover, the touch controller may receive and execute a command transmitted from the processor 1250. In addition, the touch panel 1231 may be implemented in a variety of manners, such as a resistive, capacitive, infrared, or surface acoustic wave type touch panel. In addition to the touch panel 1231, the input unit 1230 may further include another input device 1232. Specifically, the input devices 1232 may include, without any limitation, one or more of a physical keyboard, a functional key (such as a volume control key or a switch key), a track ball, a mouse, a joystick and the like.

The display unit 1240 may be configured to display information input by the user or information provided to the user, and various menu interfaces of the user equipment. The display unit 1240 may include a display panel 1241. Optionally, the display panel 1241 may be configured by using a liquid crystal display (LCD), an organic light-emitting diode (OLED), or the like.

It should be noted that the touch panel 1231 may cover the display panel 1241 to form a touch display screen. After detecting a touch operation on or near the touch display screen, the touch display screen transfers the touch operation to the processor 1250 to determine the type of a touch event, and the processor 1250 then provides a corresponding visual output on the touch display screen according to the type of the touch event.

The touch display screen includes an application program interface display area and a common control display area. A manner of arranging the application program interface display area and the common control display area is not limited, and may be an arrangement manner that can distinguish between two display areas, for example, an up-and-down arrangement or a side-by-side arrangement. The application program interface display area may be configured to display an interface of an application program. Each interface may include at least one interface element such as an icon of an application program and/or a widget desktop control. Alternatively, the application program interface display area may be a blank interface that does not include any content. The common control display area is configured to display a frequently used control, for example, a setting button, an interface number, a scroll bar, or an application program icon such as a phone book icon.

The processor 1250 is a control center of the user equipment. The processor 1250 is connected to each part of the entire mobile phone by using various interfaces and lines, and performs various functions of the user equipment and processes data by running or executing a software program and/or a module stored in the first storage 1221 and calling data stored in the second storage 1222, so as to perform overall monitoring of the user equipment. Optionally, the processor 1250 may include one or more processing units.

In the embodiments of the present disclosure, by calling the software program and/or module stored in the first storage 1221 and the data in the second storage 1222, the processor 1250 is configured to: receive an NR-PSS by using a first frequency domain resource, receive an NR-SSS by using a second frequency domain resource, receive an NR-PBCH signal by using a third frequency domain resource. An SS block includes the NR-PSS, the NR-SSS, and the NR-PBCH signal, and a position relationship among the first frequency domain resource, the second frequency domain resource, and the third frequency domain resource satisfies a preset condition.

Optionally, that a position relationship among the first frequency domain resource, the second frequency domain resource, and the third frequency domain resource satisfies a preset condition includes: a center frequency of the first frequency domain resource, a center frequency of the second frequency domain resource, and a center frequency of the third frequency domain resource are aligned.

Optionally, that a position relationship among the first frequency domain resource, the second frequency domain resource, and the third frequency domain resource satisfies a preset condition includes: the first frequency domain resource, the second frequency domain resource, and the third frequency domain resource are aligned at a high frequency.

Optionally, that a position relationship among the first frequency domain resource, the second frequency domain resource, and the third frequency domain resource satisfies a preset condition includes: the first frequency domain resource, the second frequency domain resource, and the third frequency domain resource are aligned at a low frequency.

That a position relationship among the first frequency domain resource, the second frequency domain resource, and the third frequency domain resource satisfies a preset condition includes: the first frequency domain resource is aligned with the third frequency domain resource at a low frequency, the second frequency domain resource is aligned with the third frequency domain resource at a high frequency; or, the second frequency domain resource is aligned with the third frequency domain resource at a low frequency, the first frequency domain resource is aligned with the third frequency domain resource at a high frequency.

Specifically, the processor 1250 is further configured to: receive the NR-PSS on a first time domain resource by using the first frequency domain resource; receive the NR-SSS on a second time domain resource by using the second frequency domain resource; receive the NR-PBCH signal on a third time domain resource by using the third frequency domain resource.

The third time domain resource may be consecutive time domain symbols or may be non-consecutive time domain symbols.

In an implementation of the present disclosure, the first time domain resource is located before the second time domain resource. In another implementation of the present disclosure, the second time domain resource is located before the first time domain resource.

In the embodiments of the present disclosure, a position relationship among a first frequency domain resource, a second frequency domain resource, and a third frequency domain resource satisfies a preset condition, an NR-PSS is transmitted by using the first frequency domain resource, an NR-SSS is transmitted by using the second frequency domain resource, an NR-PBCH signal is transmitted by using the third frequency domain resource. An SS block transmission is enabled in an NR system by using the foregoing frequency domain resource mapping relationship, making it convenient for user equipment to receive the SS block.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be neglected or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of this disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, the technical solutions of this disclosure essentially, or the part contributing to the prior art, or a part of the technical solutions may be implemented in a form of a software product. The software product is stored in a storage medium, and includes several instructions for instructing a computer device (which may be a personal computer, a server, or network equipment) to perform all or a part of the steps of the methods described in the embodiments of the disclosure. The foregoing storage medium includes any medium that can store program code, such as a universal serial bus (USB) flash drive, a removable hard disk, a read-only memory (ROM), a random access memory (RAM), a magnetic disk, or an optical disc.

In addition, it should be noted that in the apparatuses and methods of the present disclosure, apparently, parts or steps may be divided and/or recombined. The division and/or recombination should be regarded as an equivalent solutions of the present disclosure. Moreover, steps of the above series of processes may be performed naturally in a time order of description. However, the performing sequence is not limited to the time order. Some steps may be performed in parallel or independently. Persons of ordinary skill in the art would appreciate that all or any steps or parts of the methods and apparatuses of the present disclosure may be implemented in any computing apparatus (including a processor, a storage medium or the like) or a network of computing apparatuses in hardware, firmware, software or a combination thereof, and this can be achieved by persons of ordinary skill in the art by using their basic programming skill after reading the description of the present disclosure.

Thus, the object of the present disclosure may also be implemented by running a program or a set of programs on any computing apparatus. The computing apparatus may be a known general purpose apparatus. Thus, the object of the present disclosure may also be implemented merely by providing a program product which contains program code for implementing the methods or apparatuses. That is, such program product also constitutes the present disclosure, and a storage medium in which such a program product is stored also constitutes the present disclosure. Apparently, the storage medium may be any known storage medium or any storage medium that will be developed in the future. It should also be noted that, in the apparatuses and methods of the present disclosure, apparently, parts or steps may be divided and/or recombined. The division and/or recombination should be regarded as an equivalent solutions of the present disclosure. Moreover, steps of the above method may be performed naturally in a time order of description, however the performing sequence is not limited to the time order. Some steps may be performed in parallel or independently.

The foregoing descriptions are only preferred implementations of the present disclosure. It should be noted that for a person of ordinary skill in the art, several improvements and modifications may further be made without departing from the principle of the present disclosure. These improvements and modifications should also be deemed as falling within the scope of the present disclosure.

What is claimed is:

1. A method of transmitting a synchronized signal block (SS block), applied to a network equipment side, wherein the SS block comprises a New Radio (NR)-primary synchronized signal (PSS), an NR-secondary synchronized signal (SSS), and an NR-physical broadcast channel (PBCH) signal, and the method comprises the following steps:
    transmitting the NR-PSS by using a first frequency domain resource, transmitting the NR-SSS by using a second frequency domain resource, transmitting the NR-PBCH signal by using a third frequency domain resource, wherein a position relationship among the first frequency domain resource, the second frequency domain resource, and the third frequency domain resource satisfies a preset condition;
    wherein that the position relationship among the first frequency domain resource, the second frequency domain resource, and the third frequency domain resource satisfies the preset condition comprises:
        a center frequency of the first frequency domain resource, a center frequency of the second frequency domain resource, and a center frequency of the third frequency domain resource are aligned,
    wherein a number of resource blocks of at least one of the first frequency domain resource and the second frequency domain resource is different from a number of resource blocks of the third frequency domain resource;
    wherein the transmitting the NR-PSS by using the first frequency domain resource, transmitting the NR-SSS by using the second frequency domain resource, transmitting the NR-PBCH signal by using the third frequency domain resource comprises:
        transmitting the NR-PSS on a first time domain resource by using the first frequency domain resource; transmitting the NR-SSS on a second time domain resource by using the second frequency domain resource; transmitting the NR-PBCH signal on a third time domain resource by using the third frequency domain resource;
    wherein the third time domain resource is consecutive time domain symbols;
    wherein the first time domain resource, the second time domain resource and the third time domain resource occupy four consecutive time domain symbols, a time domain symbol occupied by the first time domain resource and a time domain symbol occupied by the second time domain resource are spaced by one time domain symbol, and a last time domain symbol of the four consecutive time domain symbols is occupied by the third time domain resource.

2. The method of transmitting the SS block according to claim 1, wherein the first time domain resource is located before the second time domain resource;

or, the second time domain resource is located before the first time domain resource.

3. Network equipment, comprising: a storage, a processor, and a computer program stored in the storage and configured to be executed by the processor, wherein the processor is configured to execute the computer program, to implement the steps in the method of transmitting the synchronized signal block (SS block) according to claim 1.

4. A computer readable storage medium, storing therein a computer program, wherein the program is configured to be executed by a processor, to implement the steps in the method of transmitting the synchronized signal block (SS block) according to claim 1.

5. A method of transmitting a synchronized signal block (SS block), applied to a user equipment side, wherein the SS block comprises a New Radio (NR)-primary synchronized signal (PSS), an NR-secondary synchronized signal (SSS), and an NR-physical broadcast channel (PBCH) signal, and the method comprises the following steps:

receiving the NR-PSS by using a first frequency domain resource, receiving the NR-SSS by using a second frequency domain resource, receiving the NR-PBCH signal by using a third frequency domain resource, wherein a position relationship among the first frequency domain resource, the second frequency domain resource, and the third frequency domain resource satisfies a preset condition;

wherein that the position relationship among the first frequency domain resource, the second frequency domain resource, and the third frequency domain resource satisfies the preset condition comprises:

a center frequency of the first frequency domain resource, a center frequency of the second frequency domain resource, and a center frequency of the third frequency domain resource are aligned, wherein a number of resource blocks of at least one of the first frequency domain resource and the second frequency domain resource is different from a number of resource blocks of the third frequency domain resource;

wherein the step of receiving the NR-PSS by using the first frequency domain resource, receiving the NR-SSS by using the second frequency domain resource, receiving the NR-PBCH signal by using the third frequency domain resource comprises:

receiving the NR-PSS on a first time domain resource by using the first frequency domain resource; receiving the NR-SSS on a second time domain resource by using the second frequency domain resource; receiving the NR-PBCH signal on a third time domain resource by using the third frequency domain resource;

wherein the third time domain resource is consecutive time domain symbols;

wherein the first time domain resource, the second time domain resource and the third time domain resource occupy four consecutive time domain symbols, a time domain symbol occupied by the first time domain resource and a time domain symbol occupied by the second time domain resource are spaced by one time domain symbol, and a last time domain symbol of the four consecutive time domain symbols is occupied by the third time domain resource.

6. The method of transmitting the SS block according to claim 5, wherein the first time domain resource is located before the second time domain resource;

or, the second time domain resource is located before the first time domain resource.

7. A computer readable storage medium, storing therein a computer program, wherein the program is configured to be executed by a processor, to implement the steps in the method of transmitting the synchronized signal block (SS block) according to claim 5.

8. User equipment, comprising: a storage, a processor, and a computer program stored in the storage and configured to be executed by the processor, wherein the processor is configured to execute the computer program, to implement a method of transmitting a synchronized signal block (SS block), applied to a user equipment side, wherein the SS block comprises a New Radio (NR)-primary synchronized signal (PSS), an NR-secondary synchronized signal (SSS), and an NR-physical broadcast channel (PBCH) signal, and the method comprises the following steps:

receiving the NR-PSS by using a first frequency domain resource, receiving the NR-SSS by using a second frequency domain resource, receiving the NR-PBCH signal by using a third frequency domain resource, wherein a position relationship among the first frequency domain resource, the second frequency domain resource, and the third frequency domain resource satisfies a preset condition;

wherein that the position relationship among the first frequency domain resource, the second frequency domain resource, and the third frequency domain resource satisfies the preset condition comprises:

a center frequency of the first frequency domain resource, a center frequency of the second frequency domain resource, and a center frequency of the third frequency domain resource are aligned, wherein a number of resource blocks of at least one of the first frequency domain resource and the second frequency domain resource is different from a number of resource blocks of the third frequency domain resource;

wherein the step of receiving the NR-PSS by using the first frequency domain resource, receiving the NR-SSS by using the second frequency domain resource, receiving the NR-PBCH signal by using the third frequency domain resource comprises:

receiving the NR-PSS on a first time domain resource by using the first frequency domain resource; receiving the NR-SSS on a second time domain resource by using the second frequency domain resource; receiving the NR-PBCH signal on a third time domain resource by using the third frequency domain resource;

wherein the third time domain resource is consecutive time domain symbols;

wherein the first time domain resource, the second time domain resource and the third time domain resource occupy four consecutive time domain symbols, a time domain symbol occupied by the first time domain resource and a time domain symbol occupied by the second time domain resource are spaced by one time domain symbol, and a last time domain symbol of the four consecutive time domain symbols is occupied by the third time domain resource.

\* \* \* \* \*